(12) United States Patent
Khalid et al.

(10) Patent No.: US 10,367,919 B2
(45) Date of Patent: Jul. 30, 2019

(54) METHODS AND SYSTEMS FOR EFFICIENT DISTRIBUTION OF VIRTUAL REALITY MEDIA CONTENT

(71) Applicant: Verizon Patent and Licensing Inc., Arlington, VA (US)

(72) Inventors: Mohammad Raheel Khalid, Budd Lake, NJ (US); Ali Jaafar, Morristown, NJ (US); Dan Sun, Bridgewater, NJ (US); Christian Egeler, Basking Ridge, NJ (US); Samir S. Vaidya, Highland Park, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 252 days.

(21) Appl. No.: 15/087,843

(22) Filed: Mar. 31, 2016

(65) Prior Publication Data

US 2017/0289221 A1     Oct. 5, 2017

(51) Int. Cl.
*H04L 29/06*      (2006.01)

(52) U.S. Cl.
CPC .......... *H04L 67/38* (2013.01); *H04L 65/4084* (2013.01); *H04L 65/602* (2013.01); *H04L 65/604* (2013.01); *H04L 65/607* (2013.01)

(58) Field of Classification Search
CPC ...................................... H04L 65/60
See application file for complete search history.

(56) References Cited

U.S. PATENT DOCUMENTS

| | | | |
|---|---|---|---|
| 2006/0256113 A1* | 11/2006 | Grover | H04N 13/0029 345/427 |
| 2013/0159455 A1* | 6/2013 | Braskich | H04L 67/303 709/217 |
| 2013/0249900 A1* | 9/2013 | Lee | G06T 19/006 345/419 |
| 2015/0346832 A1* | 12/2015 | Cole | H04N 13/0014 345/156 |
| 2016/0239468 A1* | 8/2016 | Capt | G06F 3/04842 |
| 2017/0289219 A1* | 10/2017 | Khalid | H04L 65/4084 |

* cited by examiner

*Primary Examiner* — Vivek Srivastava
*Assistant Examiner* — Nicholas P Celani

(57) ABSTRACT

An exemplary device renders, within a field of view of an immersive virtual reality world ("world") presented on a display screen, content of the world based on a stream of a first content file comprising a first content sector of the world encoded in a high resolution and a second content sector encoded in a low resolution. The device detects user input to shift additional content included in the second content sector but not the first content sector into the field of view. In response, the device switches from receiving a stream of the first content file to receiving a stream of a second content file comprising the first content sector encoded in the low resolution and the second content sector encoded in the high resolution. The device then renders the additional content from the second content sector in the high resolution based on the second content file.

20 Claims, 16 Drawing Sheets

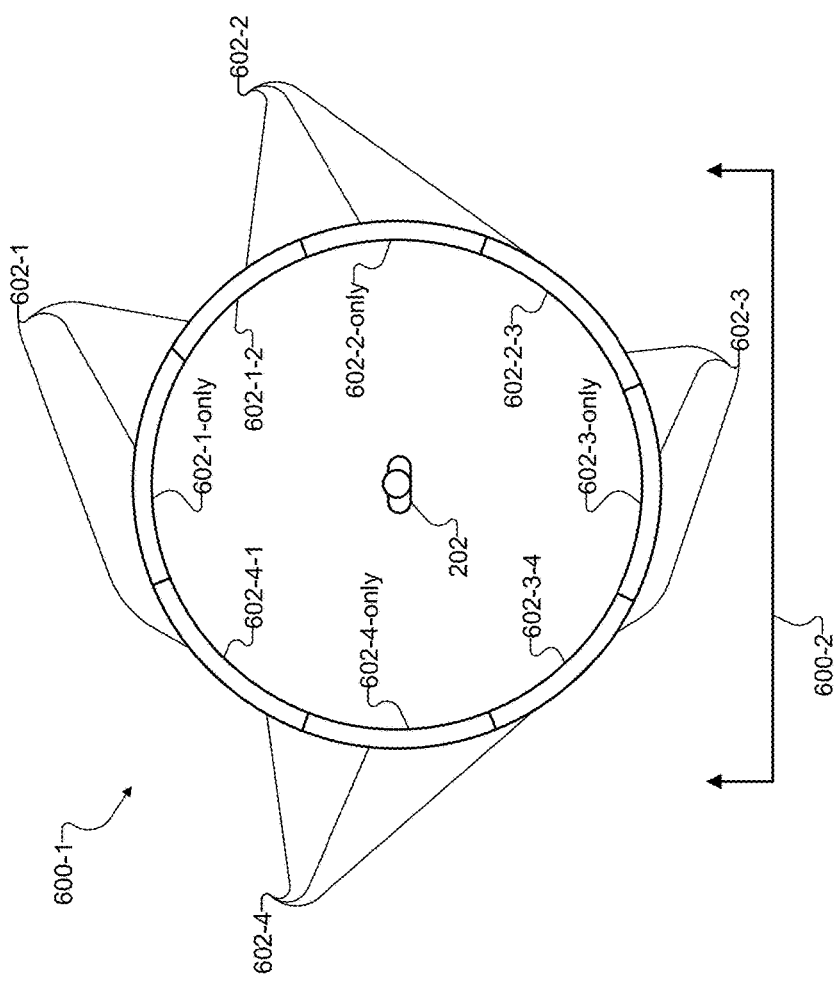

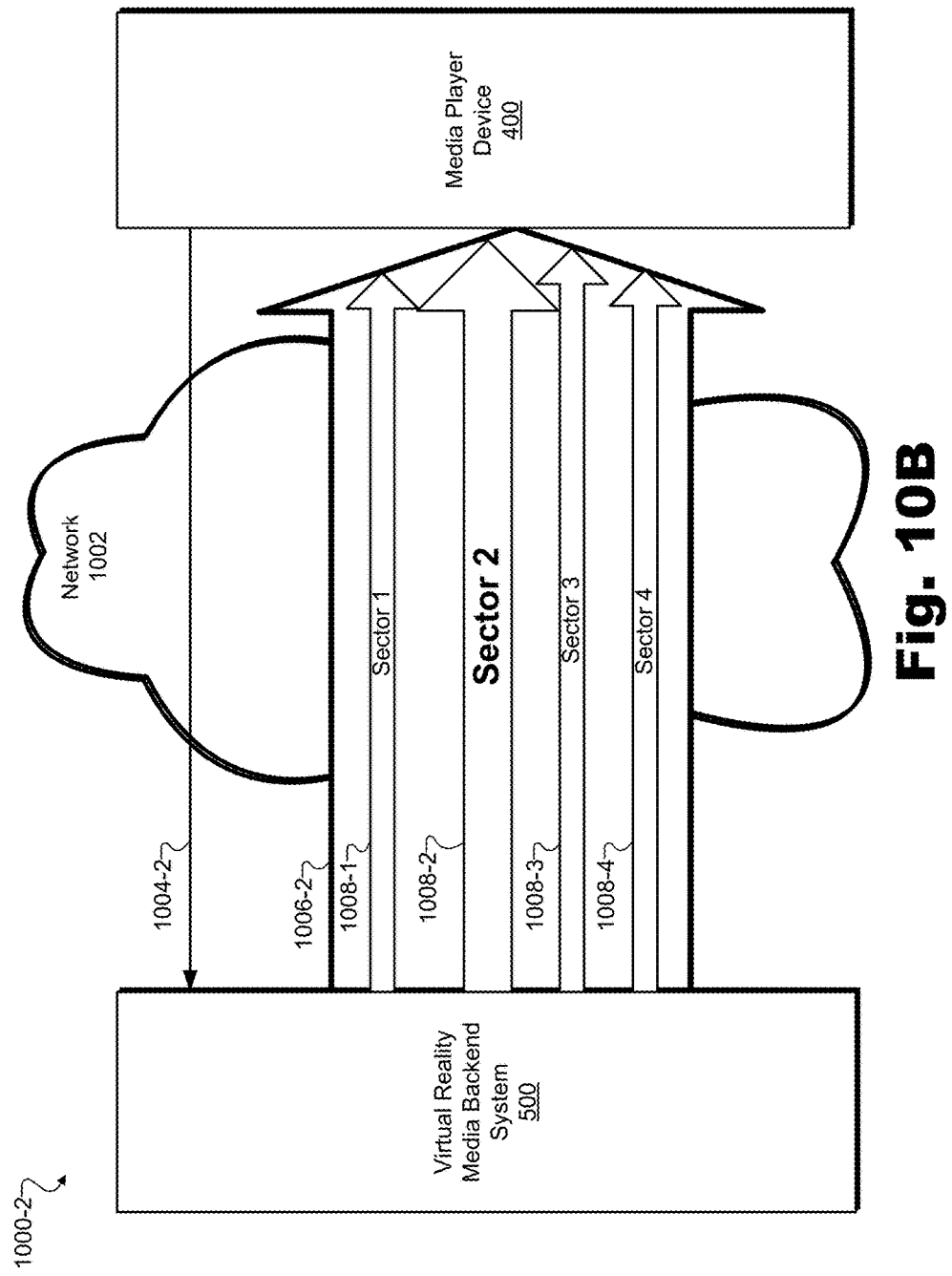

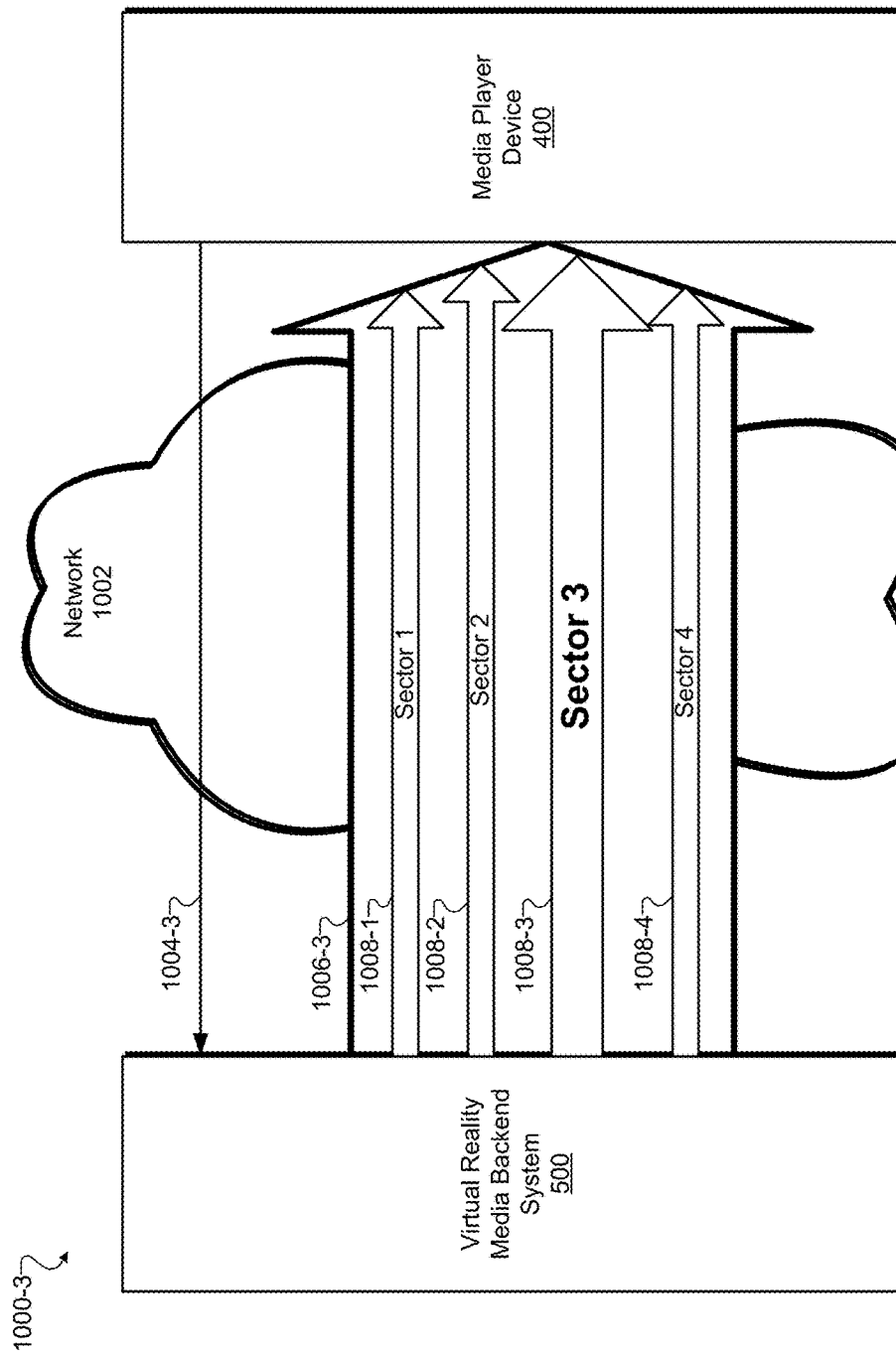

METHODS AND SYSTEMS FOR EFFICIENT DISTRIBUTION OF VIRTUAL REALITY MEDIA CONTENT

BACKGROUND INFORMATION

Advances in computing and networking technology have made new forms of media content possible. For example, virtual reality media content is available that may immerse viewers (or "users") into interactive virtual reality worlds that the users may experience by directing their attention to any of a variety of things being presented in the immersive virtual reality world at the same time. For example, at any time during the presentation of the virtual reality media content, a user experiencing the virtual reality media content may look around the immersive virtual reality world in any direction with respect to both a horizontal dimension (e.g., forward, backward, left, right, etc.) as well as a vertical dimension (e.g., up, down, etc.), giving the user a sense that he or she is actually present in and experiencing the immersive virtual reality world.

For a user to experience an immersive virtual reality world, a backend server (e.g., a computing system operated by a virtual reality media content provider) may be used to stream data representative of the immersive virtual reality world to a media player device associated with the user over a network. In this configuration, the media player device may use the data to render content included within the immersive virtual reality world in substantially real time as the data is being streamed to the media player device. Unfortunately, streaming data representative of all the content of the immersive virtual reality world in high resolution may be an inefficient use of resources and/or may present other technical challenges. For example, streaming high-resolution data representative of the entire immersive virtual reality world may utilize significant resources of the backend server providing the data, the media player device receiving the data, and/or the network carrying the data from the backend server to the media player device, even though only a relatively small portion of the data (i.e., data corresponding to content of the immersive virtual reality world in the direction the user is looking) is rendered at any given time by the media player device for experiencing by the user.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIGS. 6A and 6B illustrate exemplary views of an exemplary immersive virtual reality world comprised of partially overlapping content sectors and that may be experienced by a user according to principles described herein.

FIGS. 10A, 10B, and 10C illustrate exemplary configurations in which the virtual reality media backend system of FIG. 5 and the media player device of FIG. 4 operate to facilitate efficient distribution of virtual reality media content according to principles described herein.

DETAILED DESCRIPTION OF PREFERRED EMBODIMENTS

Figure 1:
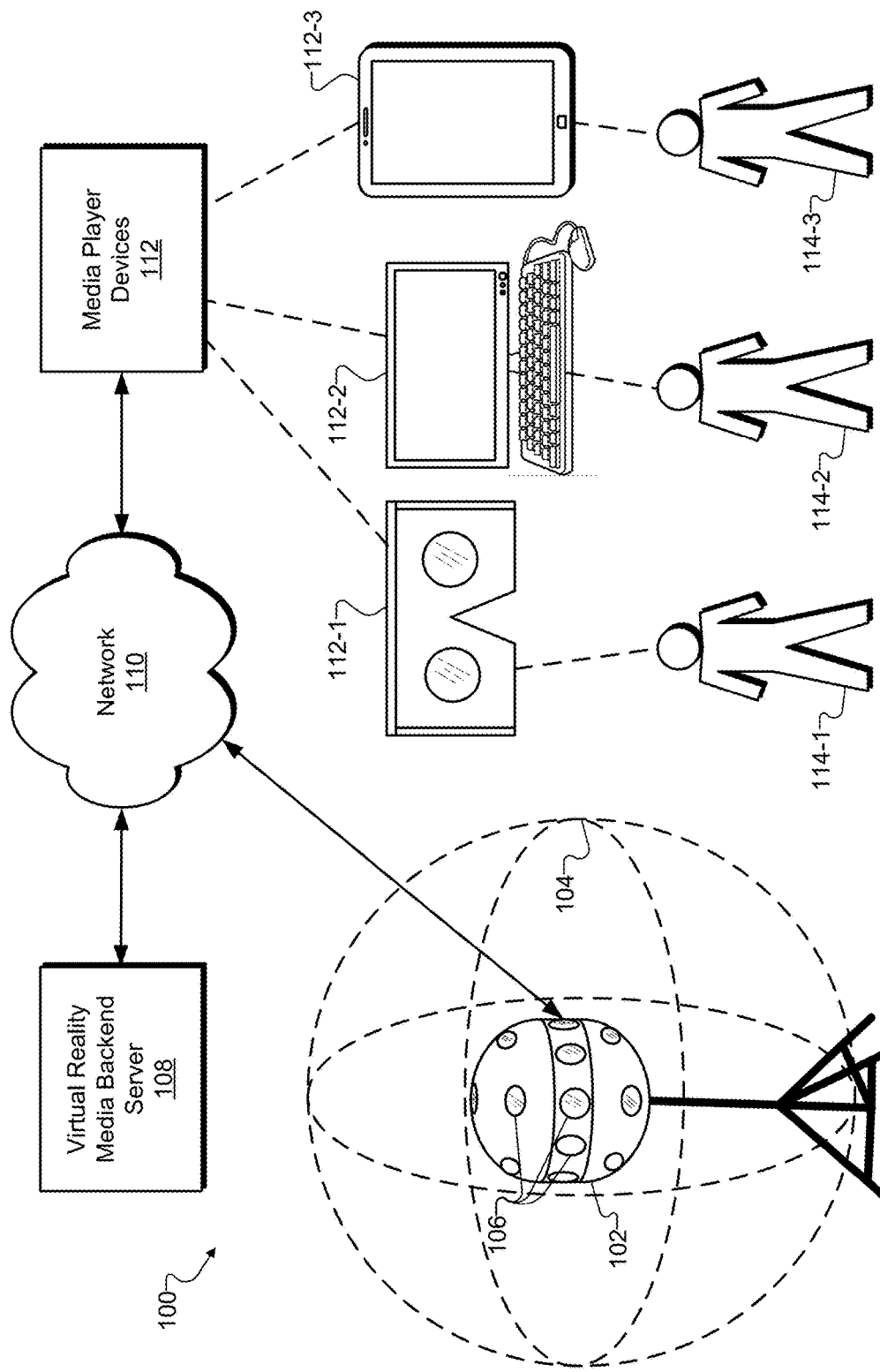
FIG. 1 illustrates an exemplary configuration in which exemplary implementations of a 360-degree camera, a virtual reality media backend server, and a media player device operate to facilitate efficient distribution of virtual reality media content according to principles described herein.

Methods and systems for facilitating efficient distribution of virtual reality media content from a server to a media player device by way of a network are described herein. As will be described and illustrated below, the virtual reality media content may include data representative of a plurality of partially overlapping content sectors that together form an immersive virtual reality world. The server (e.g., a virtual reality media backend server associated with a virtual reality media content provider) may manage a plurality of content files each including data representative of all of the content sectors in the plurality of partially overlapping content sectors. More specifically, each content file may include data representative of one content sector (i.e., a content sector to which the content file corresponds) encoded in high resolution (i.e., at a high level of quality and/or detail), and data representative of a remainder of the content sectors encoded in a low resolution (i.e., at a lower level of quality and/or detail than the high resolution). In this way, each of the managed content files may include significantly less data (e.g., less data for the server and the media player device to process and for the network to carry) than would a hypothetical content file that includes data representative of the entirety of the immersive virtual reality world encoded in the high resolution. Accordingly, to facilitate efficient distribution of the virtual reality media content, the server may provide just one of the managed content files to the media player device at a time depending on which content sector a user of the media player device is experiencing at a particular point in time.

For example, a media player device may display a field of view of an immersive virtual reality world. The immersive virtual reality world may be fully immersive in the sense that the user may not be presented with any image of the real world in which the user is located while the user is experiencing the immersive virtual reality world, in contrast to certain "augmented reality" technologies. However, while real-world scenery directly surrounding the user may not be presented together with the immersive virtual reality world, the immersive virtual reality world may, in certain examples, be generated based on data (e.g., image and/or audio data) representative of camera-captured real-world scenery rather than animated or computer-generated scenery of imaginary worlds such as those commonly generated for video games, animated entertainment programs, and so forth. For example, as will be described in more detail below, camera-captured real-world scenery may include real-world places (e.g., city streets, buildings, landscapes, etc.), real-world events (e.g., sporting events, large celebrations such as New Year's Eve or Mardi Gras, etc.), fictionalized live action entertainment (e.g., virtual reality television shows, virtual reality movies, etc.), and so forth.

A user using the media player device may experience the immersive virtual reality world by way of the field of view. For example, the field of view may include content of the immersive virtual reality world (e.g., images depicting scenery and objects surrounding the user within the immersive virtual reality world). Additionally, the field of view may dynamically change in response to user input provided by the user as the user experiences the immersive virtual reality world. For example, the media player device may detect user input (e.g., moving or turning the display screen upon which the field of view is presented) that represents a request to shift additional content into the field of view in place of the previous content included within the field of view. In response, the field of view may display the additional content in place of the previous content. In this way, the field of view may essentially provide the user a "window" through which the user can easily and naturally look around the immersive virtual reality world.

Rather than receiving data representative of the entirety of the immersive virtual reality world encoded in a high resolution from the server, the media player device may receive a stream of a first content file managed by the server and corresponding to the content sector that includes the content of the immersive virtual reality world that is currently being presented within the field of view. In other words, the first content file may comprises data representative of a plurality of partially overlapping content sectors that together form the immersive virtual reality world, including data representative of a first content sector (e.g., a content sector that includes the content of the immersive virtual reality world that is currently being presented within the field of view) encoded in a high resolution, and data representative of one or more other content sectors encoded in a low resolution (i.e., lower than the high resolution).

While the media player device is receiving the stream of the first content file, the user may direct the field of view at content included in the first content sector. Accordingly, the media player device may render the content in the high resolution. However, the media player device may later detect user input representative of a request to shift additional content into the field of view in place of the content being rendered in the field of view (i.e., the user may turn the display screen of the media player device to look elsewhere in the immersive virtual reality world). The additional content may be included in a second content sector (i.e., a content sector encoded in a lower resolution in the data of the first content file) but not included in the first content sector. In response to detecting the user input representative of the request to shift the additional content into the field of view, the media player device may transmit a command to the server to switch from streaming the first content file to the media player device to streaming a second content file corresponding to the second content sector to the media player device. The second content file may include data representative of the second content sector (i.e., the content sector that includes the additional content requested by the user to be presented within the field of view) encoded in the high resolution while including data representative of the other content sectors encoded in the low resolution.

Before the media player device begins receiving a stream of the second content file from the server, the media player device may render the additional content in the low resolution based on the data included in the first content file. In this way, the user will see the additional content requested without undue delay, even though the additional content is presented at the lower resolution. However, once the media player device begins receiving the stream of the second content file in place of the stream of the first content file (i.e., based on the transmission of the command to the server), the media player device may switch from rendering the additional content (i.e., the content of the immersive virtual reality world included in the second content sector but not in the first content sector) in the low resolution based on the first content file to rendering the additional content in the high resolution based on the second content file.

Several benefits arise by efficiently distributing virtual reality content in this way. For example, by managing a plurality of content files corresponding to each of a plurality of content sectors of the immersive virtual reality world and by switching which content file is transmitted based on commands provided by the media player device, the server may have a significantly lower processing burden than if the server were to continuously transmit a content file that includes data representative of all the content of the immersive virtual reality world encoded in the high resolution. This alleviated processing burden in the server may result in decreased costs of maintaining a virtual reality media backend server and/or in increased output of the backend server for the virtual reality media content provider associated with the backend server. As such, the backend server may be able to provide better service and/or may be able to serve more users.

Similarly, by only receiving high-resolution data (i.e., a relatively large volume of data) for a content sector where the user is currently directing the field of view within the immersive virtual reality world while receiving low-resolution data (i.e., smaller volumes of data) for content sectors not currently rendered within the field of view, the media player device may have significantly less processing to perform in order to receive and/or filter unused data. As a result, the media player device may show increased responsiveness, better battery life, and/or other benefits.

The efficient distribution of data may also benefit the network over which the virtual reality media content may be distributed by using less of the network's finite bandwidth. Along with using fewer network resources and allowing for more data to be communicated over the network, the reduced network usage may additionally result in direct cost savings for the user, who may be charged based on how much data he or she causes to be sent over the network. For example, the user may save money and enjoy more network usage without paying excessive fees for the network usage.

Moreover, all of these benefits may be available with little or no noticeable effect on the virtual reality experience for the user. In certain examples, the content file may be dynamically switched without the user noticing content being rendered at a low resolution. Even in examples where the field of view is rendered at the low resolution, no undue latency in the immersive virtual reality world may be introduced as a result of the content file switching, and any low-resolution rendering of the content of the immersive virtual reality world will be temporary only (i.e., while the media player device waits to receive a stream of a new content file). As such, the methods and systems for efficient distribution of virtual media content described herein may significantly lower the costs of the virtual reality experience to both the user and the virtual reality media content provider with little or no effect on the immersiveness of the virtual reality world to the user experiencing the immersive virtual reality world.

Various embodiments will now be described in more detail with reference to the figures. The disclosed methods and systems may provide one or more of the benefits mentioned above and/or various additional and/or alternative benefits that will be made apparent herein.

FIG. 1 illustrates an exemplary configuration 100 in which exemplary embodiments of a 360-degree camera, a virtual reality media backend server, and one or more media player devices operate to facilitate efficient distribution of virtual reality media content. As shown in FIG. 1, a 360-degree camera 102 ("camera 102") may capture and/or generate a 360-degree image of real-world scenery 104 around a center point corresponding to camera 102. For example, camera 102 may capture a plurality of images from each of a plurality of segment capture cameras 106 built into or otherwise associated with camera 102, and may generate the 360-degree image of real-world scenery 104 by combining the plurality of images captured by segment-capture cameras 106.

Camera 102 may capture data representative of 360-degree images of real-world scenery 104 and transmit the data to a virtual reality media backend server 108 ("backend server 108") by way of a network 110. After preparing and/or processing the data representative of the 360-degree images to generate an immersive virtual reality world based on the 360-degree images, backend server 108 may transmit data representative of the immersive virtual reality world to one or more media player devices 112 such as a head-mounted virtual reality device 112-1, a personal computer device 112-2, a mobile device 112-3, and/or to any other form factor of media player device that may serve a particular implementation. Regardless of what form factor media player devices 112 take, users 114 (e.g., users 114-1 through 114-3) may experience the immersive virtual reality world by way of media player devices 112. Each of the elements of configuration 100 will now be described in detail.

Camera 102 may be set up and/or operated by a virtual reality content creator and may include any type of camera that is configured to capture data representative of a 360-degree image of real-world scenery 104 around a center point corresponding to camera 102. As used herein, a 360-degree image is any still or video image that depicts the surroundings (e.g., real-world scenery 104) of a center point (e.g., a center point associated with the location of camera 102) on all sides along at least one dimension. For example, one type of 360-degree image may include a panoramic image that depicts a complete 360-degree by 45-degree ring around a center point corresponding to a camera (e.g., camera 102). Another type of 360-degree image may include a spherical image that depicts not only the ring around the center point, but an entire 360-degree by 180-degree sphere surrounding the center point on all sides. In certain examples, a 360-degree image may be based on a non-circular geometric structure. For example, certain 360-degree images may be based on cubes, rectangular prisms, pyramids, and/or other geometric structures that may serve a particular implementation, rather than being based on spheres.

Camera 102 may be configured to capture the data representative of the 360-degree image of real-world scenery 104 in any way that may serve a particular implementation. For example, as shown in FIG. 1, camera 102 may capture various segments of real-world scenery 104 using segment capture cameras 106, which may each capture an image of a single segment of real-world scenery 104 that may be combined (e.g., stitched together) with other segments to generate the 360-degree image of real-world scenery 104. In certain examples, segment capture cameras 106 may each represent a single camera unit (e.g., including a lens and suitable image capture hardware) built into a single 360-degree camera configured to capture 360-degree images. In other examples, camera 102 may include an array of segment capture cameras 106 that are each a single, standalone camera configured to capture standard images (e.g., images depicting less than a 360-degree view) that may later be combined to form the 360-degree image. In yet other examples, camera 102 may include one or more "fish-eye" lenses configured to capture a very wide-angle image (e.g., a spherical image or a semi-spherical image) that can be used as the 360-degree image or processed to generate the 360-degree image. Alternatively, camera 102 may include a single, standard camera that captures and/or combines a plurality of still images of real-world scenery 104 taken at different points in time (e.g., using a "panorama mode" of the camera or a similar feature) to capture still 360-degree images. Camera 102 may also use any combination of the 360-degree image capture techniques described above or any other capture techniques that may serve a particular implementation.

Subsequent to capturing raw image data representative of real-world scenery 104, camera 102 may generate from the raw image data a 360-degree image of real-world scenery 104. For example, camera 102 may be configured to automatically process the raw image data (e.g., by combining a plurality of images captured by segment capture cameras 106, by processing images captured by a fish-eye lens, etc.) to form the 360-degree image, and then may transmit data representative of the 360-degree image to backend server 108. Alternatively, camera 102 may be configured to transmit the raw image data directly to backend server 108, and any processing and/or combining of the raw image data may be performed within backend server 108.

Camera 102 may capture any real-world scenery 104 that may serve a particular embodiment. For example, real-world scenery 104 may include any indoor or outdoor real-world location such as the streets of a city, a museum, a scenic landscape, a satellite orbiting and looking down upon the Earth, the surface of another planet, or the like. Real-world scenery 104 may further include certain events such as a stock car race, a football game or other sporting event, a large-scale party such as New Year's Eve on Times Square in New York City, or other events that may interest potential users. In certain examples, real-world scenery 104 may be a setting for a fictionalized event, such as a set of a live-action virtual reality television show or movie.

In some implementations, capturing real-world scenery 104 using camera 102 may be optional. For example, a 360-degree image of scenery surrounding a center point may be completely computer-generated based on models of an imaginary world rather than captured from real-world scenery 104 by camera 102. As such, camera 102 may be omitted in certain examples.

Backend server 108 may comprise a server or other computing device associated with (e.g., provided and/or managed by) a virtual reality media content service provider (e.g., a network service provider, a cable service provider, a satellite service provider, an Internet service provider, a provider of virtual reality mobile applications, etc.) and may be configured to provide virtual reality media content to users (e.g., subscribers of a virtual reality media content service, users who download or otherwise acquire virtual reality mobile applications, etc.) by way of media player devices 112. To this end, backend server 108 may receive, generate, process, and/or maintain data representative of virtual reality media content. For example, backend server 108 may be configured to receive camera-captured data (e.g., video data captured by camera 102) representative of a 360-degree image of real-world scenery 104 around a center point corresponding to camera 102. If the camera-captured data is raw image data (e.g., image data captured by each of segment capture cameras 106 that has not been combined into a 360-image), backend server 108 may unwrap, combine (i.e., stitch together), or otherwise process the raw image data to form the 360-degree image representative of real-world scenery 104.

Based on the camera-captured data representative of real-world scenery 104 (e.g., the 360-degree image), backend server 108 may generate and maintain an immersive virtual reality world (i.e., data representative of an immersive virtual reality world that may be experienced by a user). For example, backend server 108 may generate a three-dimensional ("3D") model of the immersive virtual reality world where virtual objects may be presented along with projections of real-world scenery 104 to a user experiencing the immersive virtual reality world. To generate the immersive virtual reality world, backend server 108 may perform video transcoding, slicing, orchestration, modeling, and/or any other processing that may serve a particular embodiment.

As will be described in more detail below, backend server 108 may manage (e.g., generate, maintain, receive, pass through, etc.) a plurality of content files each including data representative of a plurality of partially overlapping content sectors that together form the immersive virtual reality world, and each corresponding to one of the content sectors. Examples of immersive virtual reality worlds formed from a plurality of partially overlapping content sectors will be described in more detail below.

Subsequent to or concurrent with generating one or more immersive virtual reality worlds associated with one or more virtual reality media content instances (also referred to herein as "virtual reality media content programs"), backend server 108 may provide access to the virtual reality media content programs for users such as subscribers of a virtual reality media content service operated by the virtual reality media content provider and/or users who download or otherwise acquire virtual reality mobile applications provided by the virtual reality media content provider. To this end, backend server 108 may provide data representative of content of the immersive virtual reality world to be rendered by media player devices 112 in respective fields of view that are responsive to user input from users of media player devices 112. For example, as will be described in more detail below, backend server 108 may stream a requested content file including data representative of the plurality of partially overlapping content sectors that together form the immersive virtual reality world (e.g., including virtual objects within the immersive virtual reality world, images of real-world scenery 104, etc.). Examples of immersive virtual reality worlds formed from pluralities of partially overlapping content sectors will be described below.

Camera 102, backend server 108, and media player devices 112 may communicate with one another using any suitable communication technologies, devices, media, and/or protocols supportive of data communications, including, but not limited to, socket connections, Ethernet, data bus technologies, data transmission media, communication devices, Transmission Control Protocol ("TCP"), Internet Protocol ("IP"), File Transfer Protocol ("FTP"), Telnet, Hypertext Transfer Protocol ("HTTP"), HTTPS, Session Initiation Protocol ("SIP"), Simple Object Access Protocol ("SOAP"), Extensible Mark-up Language ("XML") and variations thereof, Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), 4G Long Term Evolution ("LTE"), Voice over IP ("VoIP"), Voice over LTE ("VoLTE"), WiMax, Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications technologies.

Network 110 may include any provider-specific network (e.g., a cable or satellite carrier network or a mobile telephone network), the Internet, wide area network, or any other suitable network. Data may flow between camera 102, backend server 108, and media player devices 112 by way of network 110 using any communication technologies, devices, media, and protocols as may serve a particular implementation. While only one network 110 is shown to interconnect camera 102, backend server 108, and media player devices 112 in FIG. 1, it will be recognized that these devices and systems may intercommunicate by way of multiple interconnected networks as may serve a particular implementation.

Media player devices 112 (i.e., head-mounted virtual reality device 112-1, personal computer device 112-2, and mobile device 112-3) may be used by users 114 (i.e., users 114-1 through 114-3) to access and experience virtual reality media content received from backend server 108. To this end, media player devices 112 may each include or be implemented by any device capable of presenting a field of view of an immersive virtual reality world and detecting user input from a user (e.g. one of users 114) to dynamically change the content within the field of view as the user experiences the immersive virtual reality world. For example, media player devices 112 may include or be implemented by a head-mounted virtual reality device (e.g., a virtual reality gaming device), a personal computer device (e.g., a desktop computer, laptop computer, etc.), a mobile or wireless device (e.g., a smartphone, a tablet device, a mobile reader, etc.), or any other device that may serve a particular implementation to facilitate receiving and/or presenting virtual reality media content. As will be described in more detail below, different types of media player devices 112 (e.g., head-mounted virtual reality devices, personal computer devices, mobile devices, etc.) may provide different types of virtual reality experiences having different levels of immersiveness for users 114.

Media player devices 112 may be configured to allow users 114 to select respective virtual reality media content programs that users 114 may wish to experience on their respective media player devices 112. In certain examples, media player devices 112 may download virtual reality media content programs that users 114 may experience offline (e.g., without an active connection to backend server 108). In other examples, media player devices 112 may request and receive data streams representative of virtual reality media content programs that users 114 experience while media player devices 112 remain in active communication with backend server 108 by way of network 110.

To facilitate users 114 in experiencing virtual reality media content, each of media player devices 112 may include or be associated with at least one display screen upon which a field of view of an immersive virtual reality world may be presented. Media player devices 112 may also include software configured to receive, maintain, and/or process data representative of the immersive virtual reality world to present content of the immersive virtual reality world within the field of view on the display screens of the media player devices. For example, media player devices 112 may include dedicated, standalone software applications (e.g., mobile applications) configured to process and present data representative of immersive virtual reality worlds on the displays. In other examples, the software used to present the content of the immersive virtual reality worlds may include non-dedicated software such as standard web browser applications.

Figure 2:
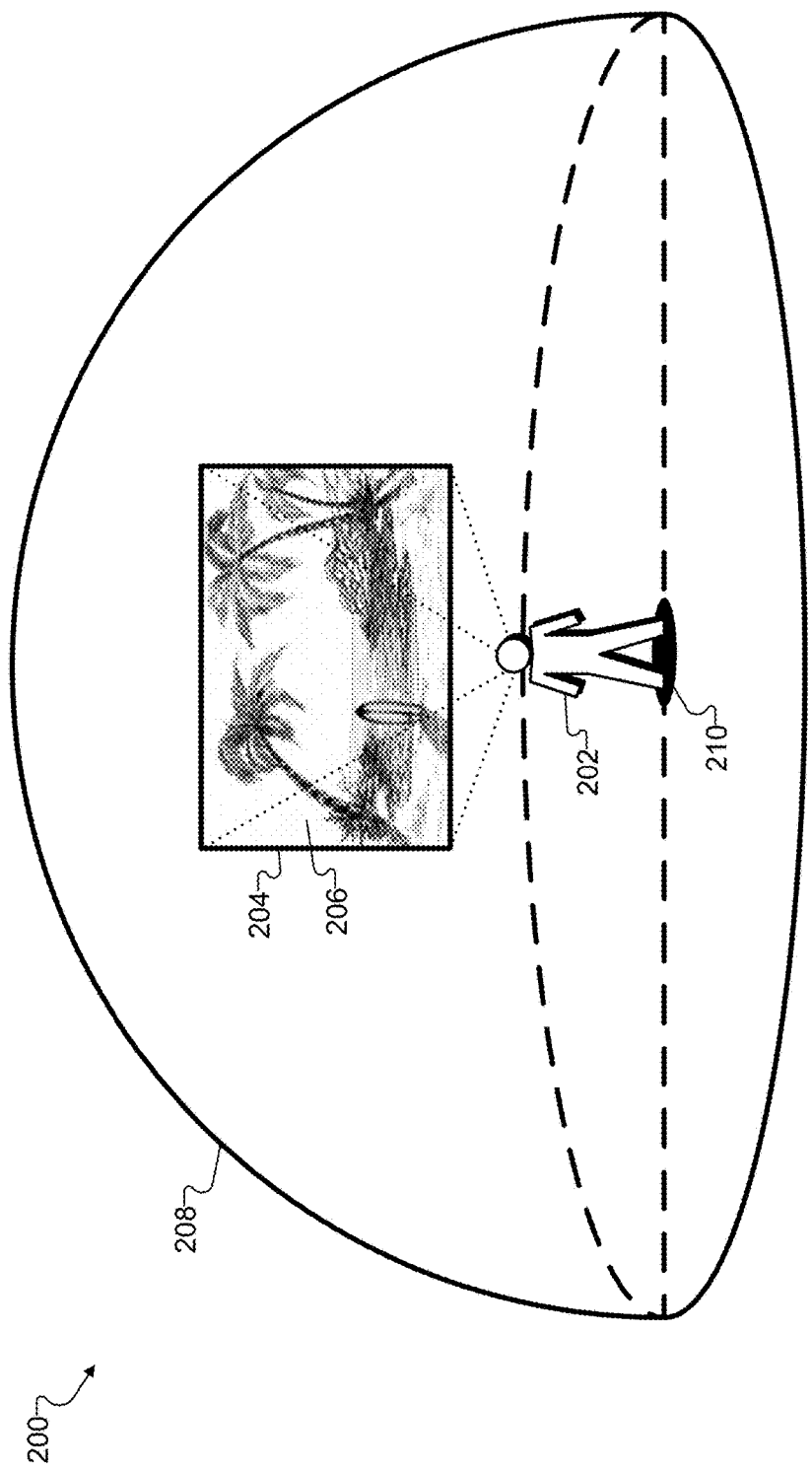
FIG. 2 illustrates an exemplary virtual reality experience in which a user is presented with an exemplary field of view that includes content of an exemplary immersive virtual reality world according to principles described herein.

FIG. 2 illustrates an exemplary virtual reality experience 200 in which a user 202 is presented with an exemplary field of view 204 that includes content 206 of an exemplary immersive virtual reality world 208. User 202 may experience immersive virtual reality world 208 ("world 208") by providing user input to dynamically change field of view 204 to display whatever content within world 208 that user 202 wishes to view. For example, the user input provided by user 202 may include an indication that user 202 wishes to look at content not currently presented within field of view 204 (i.e., content of world 208 other than content 206). For media player devices 112 such as personal computer 112-2 and/or mobile device 112-3, this user input may include a mouse movement, navigation key input from a keyboard, a swipe gesture, or the like. For media player devices 112 incorporating particular sensors (e.g., motion, directional, and/or orientation sensors) such as head-mounted virtual reality device 112-1 and/or mobile device 112-3, however, this user input may include a change to an orientation of the display screen of the media player device 112 with respect to at least one axis of at least two orthogonal axes. For example, the media player device may be configured to sense changes in orientation of the display screen with respect to an x-axis, a y-axis, and a z-axis that are all orthogonal to one another. As such, the media player device 112 may be configured to detect the change to the orientation of the display screen as user 202 experiences world 208, and the dynamic changing of the content includes gradually replacing content 206 with other content of world 208 that is determined to be visible from a viewpoint of user 202 within world 208 according to the detected change to the orientation of the display screen with respect to the at least one axis.

To illustrate, FIG. 2 shows that content 206 may include real-world scenery depicting a beach with palm trees and a surfboard. User 202 may provide user input to a media player device by which user 202 is experiencing world 208 (e.g., one of media player devices 112) to indicate that user 202 wishes to look at content to the left of content 206 currently included within field of view 204. For example, user 202 may press a left navigation key on a keyboard, perform a swipe gesture to the right, or change the orientation of the display screen with respect to a y-axis by rotating his or her head to the left while wearing a head-mounted device. In response, the real-world scenery (i.e., the palm trees, the surfboard, etc.) may scroll to the right across field of view 204 to give user 202 a sensation that he or she is turning to look to the left in world 208. As content 206 scrolls off the right side of field of view 204, new content (not explicitly shown in FIG. 2) smoothly scrolls onto the left side of field of view 204. In this way, user 202 may provide user input to cause field of view 204 to present any part of world 208 that user 202 desires.

In FIG. 2, world 208 is illustrated as a semi-sphere, indicating that user 202 may look in any direction that is substantially forward, backward, left, right, and/or up. However, if user 202 directs field of view 204 down, world 208 may not include dynamic and/or real-world scenery content to be presented within field of view 204. For example, if world 208 includes a dynamic immersive virtual reality world (i.e., using a 360-degree video image), field of view 204 may present a still image representative of the ground of world 208. In other examples, field of view 204 may present nothing (i.e., a black screen), a menu, one or more virtual objects, or any other suitable image that may serve a particular implementation. In other examples, world 208 may include an entire 360-degree by 180-degree sphere so that every direction in which user 202 may direct field of view 204 is associated with dynamic and/or real-world content of world 208.

As shown in FIG. 2, world 208 may appear to surround a center point 210 associated with user 202. In some embodiments, center point 210 may correspond to a location of a camera (e.g., camera 102) used to capture the content of world 208 (e.g., including content 206). As such, center point 210 may be static or may move through world 208 in a way that user 202 is unable to control (e.g. moving through world 208 in a same manner as camera 102 moved through real-world scenery 104 during the creation of the virtual reality media content). In other embodiments, user 202 may be able to provide input to modify where center point 210 is located within world 208. For example, user 202 may hop from one center point to another (e.g., corresponding to where each of a plurality of 360-degree cameras captured 360-degree images) within world 208 or cause center point 210 to move continuously within world 208. While center point 210 is illustrated at the feet of user 202 for simplicity of illustration, it will be understood that center point 210 may actually be located at the eye level of user 202.

Figure 3:
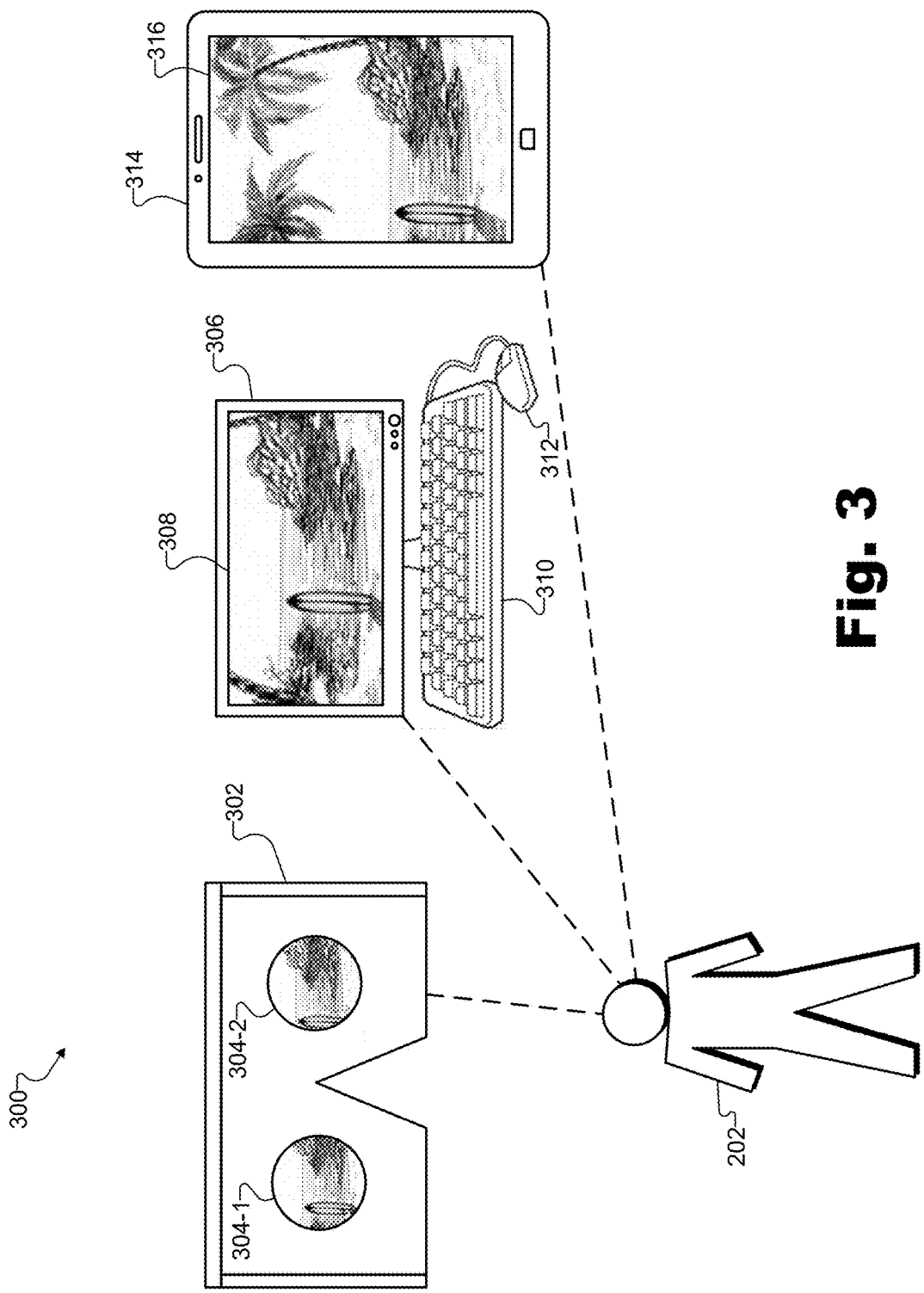
FIG. 3 illustrates exemplary media player devices configured to facilitate experiencing the immersive virtual reality world of FIG. 2 by a user according to principles described herein.

As mentioned above, different types of media player devices may provide different experiences for user 202 by presenting field of view 204 of world 208 in different ways, by receiving user input from user 202 in different ways, and so forth. To illustrate, FIG. 3 shows exemplary media player devices 300 configured to facilitate experiencing of world 208 by user 202. Media player devices 300 may correspond to media player devices 112, described above in relation to FIG. 1.

As one example, a head-mounted virtual reality device 302 may be mounted on the head of user 202 and arranged so that each of the eyes of user 202 sees a distinct display screen 304 (e.g., display screens 304-1 and 304-2) within head-mounted virtual reality device 302. In some examples, a single display screen 304 may be presented and shared by both eyes of user 202. In other examples, as shown, distinct display screens 304 within head-mounted virtual reality device 302 may be configured to display slightly different versions (i.e., stereoscopic versions) of field of view 204 to give user 202 the sense that world 208 is three-dimensional. Display screens 304 may also be configured to display content 206 such that content 206 fills the peripheral vision of user 202, providing even more of a sense of realism to user 202. Moreover, head-mounted virtual reality device 302 may include motion sensors (e.g., accelerometers), directional sensors (e.g., magnetometers), orientation sensors (e.g., gyroscopes), and/or other suitable sensors to detect natural movements (e.g., head movements) of user 202 as user 202 experiences world 208. Thus, user 202 may provide input indicative of a desire to move field of view 204 in a certain direction and by a certain amount in world 208 by simply turning his or her head in that direction and by that amount. As such, head-mounted virtual reality device 302 may provide user 202 with a natural and hands-free experience that does not require any physical console control to experience the immersive virtual reality world and that may be the most immersive virtual reality experience provided by any type of media player device.

As another example of a media player device, a personal computer device 306 having a display screen 308 (e.g., a monitor) may be used by user 202 to experience world 208. Because display screen 308 may not provide the distinct stereoscopic view for each of the user's eyes and/or may not fill the user's peripheral vision, personal computer device 306 may not provide the same degree of immersiveness that head-mounted virtual reality device 302 provides. However, personal computer device 306 may be associated with other advantages such as its ubiquity among casual virtual reality users that may not be inclined to purchase or use a head-mounted virtual reality device. In some examples, personal computer device 306 may allow a user to experience virtual reality content within a standard web browser so that user 202 may conveniently experience world 208 without using special devices or downloading special software. User 202 may provide user input to personal computer device 306 by way of a keyboard 310 (e.g., using navigation keys on keyboard 310 to move field of view 204) and/or by way of a mouse 312 (e.g., by moving mouse 312 to move field of view 204). In certain examples, a combination of keyboard 310 and mouse 312 may be used to provide user input such as by moving field of view 204 by way of navigation keys on keyboard 310 and clicking or otherwise interacting with objects within world 208 by way of mouse 312.

As yet another example of a media player device, a mobile device 314 having a display screen 316 may be used by user 202 to experience world 208. Mobile device 314 may incorporate certain advantages of both head-mounted virtual reality devices and personal computer devices to provide the most versatile type of media player device for experiencing world 208. Specifically, like personal computer devices, mobile devices are extremely ubiquitous, potentially providing access to many more people than dedicated head-mounted virtual reality devices. However, because many mobile devices are equipped with motion sensors, directional sensors, orientation sensors, etc., mobile devices may also be configured to provide user 202 with an immersive experience comparable to that provided by head-mounted virtual reality devices. For example, mobile device 314 may be configured to divide display screen 316 into two versions (e.g., stereoscopic versions) of field of view 204 and to present content 206 to fill the peripheral vision of user 202 when mobile device 314 is mounted to the head of user 202 using a relatively inexpensive and commercially-available mounting apparatus (e.g., a GOOGLE Cardboard apparatus). In other embodiments, mobile device 314 may facilitate experiencing world 208 by receiving movement-based user input at arm's length (i.e., not mounted to the head of user 202 but acting as a hand-held dynamic window for looking around world 208), by receiving swipe gestures on a touchscreen, or by other techniques that may serve a particular embodiment.

Figure 4:
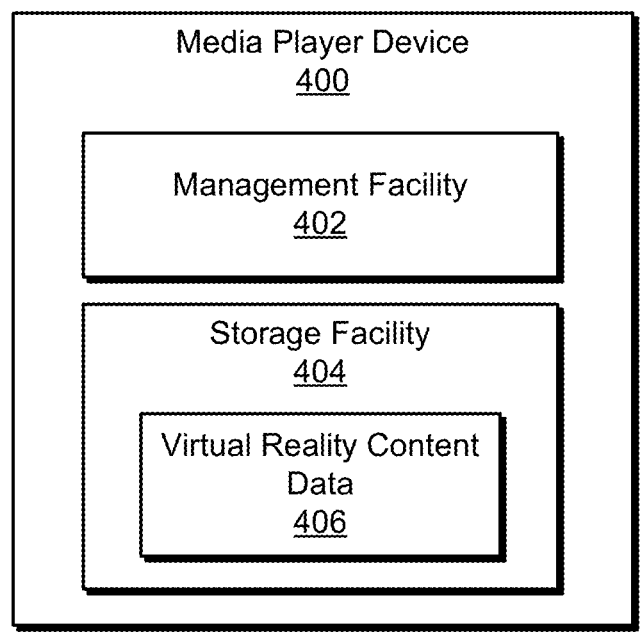
FIG. 4 illustrates an exemplary media player device that may be used in accordance with methods and systems for efficient distribution of virtual reality media content according to principles described herein.

FIG. 4 illustrates an exemplary media player device 400 ("device 400") that may be used in accordance with the methods and systems described herein. As shown, device 400 may include, without limitation, a management facility 402 and a storage facility 404 selectively and communicatively coupled to one another. It will be recognized that although facilities 402 and 404 are shown to be separate facilities in FIG. 4, facilities 402 and/or 404 may be combined into a single facility or divided into more facilities as may serve a particular implementation.

Device 400 may be implemented by or may include one or more devices and/or systems described above in relation to FIG. 1 and/or FIG. 3. For example, device 400 may be implemented entirely by one of media player devices 112 or media player devices 300. In certain embodiments, camera 102, components of network 110, and/or one or more other computing devices (e.g., servers) remote from and communicatively coupled to media player devices 112 by way of network 110 may also serve to implement at least certain components and/or operations of device 400. As will be described in more detail below, device 400 may be configured to render (i.e., to prepare for display and to present) field of view 204 of world 208 (described above in relation to FIG. 2) within a display screen associated with device 400.

Storage facility 404 may maintain virtual reality content data 406 generated, received, and/or used by management facility 402. For example, virtual reality content data 406 may include data representative of content of world 208 (e.g., data representative of one or more 360-degree images that include content 206 shown in FIG. 2), data representative of one or more content files comprising data representative of a plurality of content sectors that together form world 208, data representative of one or more virtual objects that may be presented within world 208, and/or data used to transmit a command to switch from streaming one content file to another content file based on user input directing field of view 204 at a content sector of world 208. Virtual reality content data 406 may further include data representative of an area of world 208 currently being presented within field of view 204 (e.g., including which content sector the area is included within), data used to track the location of field of view 204, data used to present and/or render content to be presented within field of view 204, and/or any other data that may serve a particular implementation.

Management facility 402 may perform any suitable management operations for proper functionality of device 400. For example, management facility 402 may request, receive, and/or render data representative of world 208, which may be managed and provided by a server (e.g., backend server 108) in one or more streams sent to device 400 over network 110. Management facility 402 may further perform operations to implement or facilitate any of the operations described herein as being performed by device 400, and/or any other management operations for device 400 as may serve a particular implementation. Exemplary operations that may be performed by device 400 (i.e., management facility 402) will be described herein.

Figure 5:
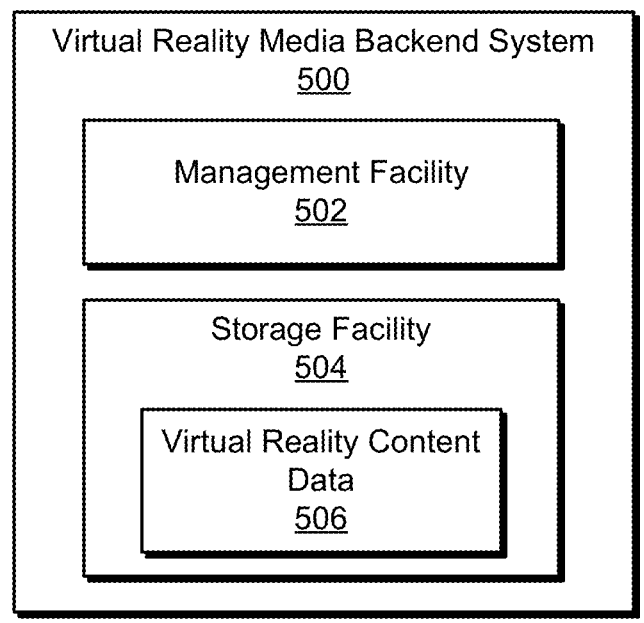
FIG. 5 illustrates an exemplary virtual reality media backend system that may be used in accordance with methods and systems for efficient distribution of virtual reality media content according to principles described herein.

FIG. 5 illustrates an exemplary virtual reality media backend system 500 ("system 500") configured to facilitate efficient distribution of virtual reality media content. As shown, system 500 may include, without limitation, a management facility 502 and a storage facility 504 selectively and communicatively coupled to one another. It will be recognized that although facilities 502 and 504 are shown to be separate facilities in FIG. 5, facilities 502 and 504 may be combined into fewer facilities, such as into a single facility, or divided into more facilities as may serve a particular implementation.

System 500 may be implemented by or may include one or more devices and/or systems described above in relation to FIG. 1. For example, system 500 may be implemented entirely by backend server 108. In certain embodiments, camera 102, components of network 110, and/or one or more other computing devices (e.g., servers) may also serve to implement at least certain components and/or operations of system 500. As will be described in more detail below, system 500 may manage (e.g., receive, maintain, pass through, etc.), and/or provide (e.g., stream) data representative of virtual reality media content to media player devices such as device 400, described above in relation to FIG. 4.

Storage facility 504 may maintain virtual reality content data 506 received, generated, managed, maintained, used, and/or transmitted by management facility 502. Virtual reality content data 506 may include at least some of the same or similar data as described above in relation to virtual reality content data 406 of FIG. 4. For example, virtual reality content data 506 may include data representative of content of world 208 (e.g., data representative of one or more 360-degree images that include content 206 shown in FIG. 2), data representative of one or more content files comprising data representative of a plurality of content sectors that together form world 208, data representative of one or more virtual objects that may be presented within world 208, and/or data used to switch from streaming one content file to another content file based on commands (e.g., received from device 400) indicating that the other content file is to be streamed in place of the first content file. Virtual reality content data 506 may further include any other data that may serve a particular implementation.

Management facility 502 may perform any suitable operations for managing the efficient distribution of virtual reality media content from system 500 to one or more media player devices (e.g., device 400). For example, as will be described in more detail below, management facility 502 may manage a plurality of content files each including data representative of a plurality of partially overlapping content sectors that together form an immersive virtual reality world (e.g., world 208).

As used herein, content files may include any data structure, data resource, etc., that includes data representative of content of an immersive virtual reality world. As such, content files may take any form that may serve a particular embodiment, whether or not conforming to certain norms shared by certain data structures traditionally referred to as data files. For example, content files may include a discrete and finite set of data (i.e., data representative of the content of the immersive virtual reality world) and may be maintained (e.g., stored) on a storage drive of a server (e.g., within storage facility 504 of system 500). In other examples, however, content files may include a continuous and/or potentially unbounded set of data (e.g., from a continuous data stream) and may be managed by a server by passing through the server and/or being processed by the server, but not necessarily by being maintained or stored on the server. For example, system 500 may manage a content file comprising a data stream continuously transmitted by a video camera (e.g., camera 102 of FIG. 1) or by a content creator system (e.g., a virtual reality media content station that provides a continuous stream of virtual reality media content at all times). Examples of content files and the data representative of the plurality of partially overlapping content sectors included within each content file will be described below.

Management facility 502 may be further configured to determine that a user (e.g., user 202) of a media player device that is receiving a content file being streamed by system 500 (e.g., device 400) provides user input representative of a request to shift additional content into the field of view (e.g., field of view 204). For example, the additional content may be included in a second content sector but not included within a first content sector corresponding to the content file that is being streamed. To determine that the user provides the user input representative of the request to shift the additional content into the field view, management facility 502 may provide device 400 with data representative of a plurality of uniform resource locators ("URLs") that each correspond to a different content file in the plurality of content files managed by the server. Then, when user 202 provides the user input to device 400 representative of the request to shift the additional content into field of view 204, management facility 502 may determine that user 202 provided the user input by receiving a command to switch from streaming the first content file to streaming the second content file, the command taking the form of a selection by device 400 of a URL included in the plurality of URLs and that corresponds to the second content file instead of to the first content file.

Management facility 502 may further perform operations to implement or facilitate any of the operations described herein as being performed by system 500, and/or any other management operations for system 500 as may serve a particular implementation.

To illustrate how system 500 may facilitate efficient distribution of virtual reality media content to device 400, various examples will now be provided. In particular, the examples below illustrate exemplary immersive virtual reality worlds formed from pluralities of partially overlapping content sectors (see FIGS. 6A-6B and FIG. 9), exemplary content files representative of an exemplary immersive virtual reality world (see FIG. 7), exemplary content represented within content files (see FIG. 8), and exemplary configurations in which system 500 efficiently distributes virtual reality media content to device 400 (see FIGS. 10A-10C).

Figure 6B:
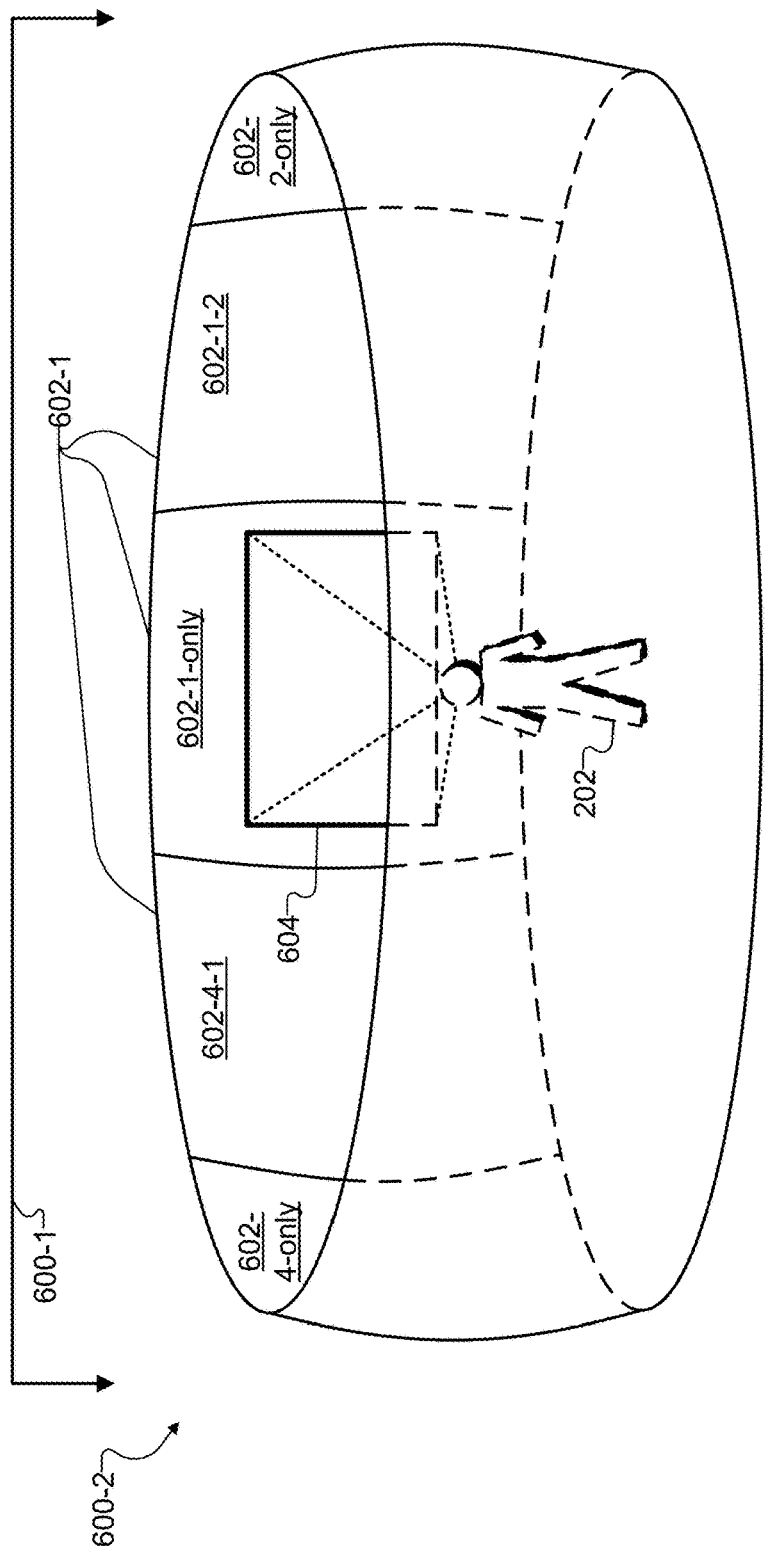

FIGS. 6A and 6B illustrate exemplary views 600-1 (see FIG. 6A) and 600-2 (see FIG. 6B) of an exemplary immersive virtual reality world 600 ("world 600") formed from partially overlapping content sectors 602 (e.g., content sectors 602-1, 602-2, 602-3, and 602-4) and that may be experienced by user 202. For ease of explanation, world 600 is illustrated as a ring-shaped immersive virtual reality world. As such, world 600 may be formed from a 360-degree image that depicts the surroundings (e.g., real-world scenery such as real-world scenery 104 described above in relation to FIG. 1) of a center point associated with a position of user 202 within world 600 on all sides along the horizontal dimension. However, the 360-degree image of world 600 may not be a fully spherical image that depicts an entire 360-degree by 180-degree sphere surrounding the center point. Instead, the 360-degree image of world 600 may depict approximately a 360-degree by 60-degree ring around the center point that does not include surroundings of the center point directly above or below the center point. While the simple ring shape of world 600 may facilitate illustrating and describing various aspects of how system 500 may efficiently deliver virtual reality media content (e.g., comprising content sectors 602) to device 400 for user 202 to experience the virtual reality media content, it will be understood that the same principles described in relation to the embodiment of FIGS. 6A and 6B may apply to embodiments that include fully spherical immersive virtual reality worlds or other suitable immersive virtual reality worlds taking the form of other suitable geometric structures (i.e., cubes, pyramids, semi-spheres, etc.). To illustrate, an example of a semi-spherical immersive virtual reality world will be described and illustrated briefly below in relation to FIG. 9.

As shown, view 600-1 of world 600 is a top view of world 600 showing a top view of user 202 approximately at the center point of world 600 as user 202 experiences world 600. View 600-1 illustrates all of content sectors 602 around an entirety of the 360-degree ring of world 600, as will be described in more detail below. View 600-2, in contrast, is a perspective view of world 600 from a side of world 600. While only a few of content sectors 602 are explicitly shown in view 602-2, view 602-2 better illustrates what world 600 may look like to user 202 as user 202 experiences world 600. For example, view 602-2 illustrates a field of view 604 controlled by user 202 that may be used by user 202 to look anywhere within world 600, as described above.

It will be understood that the relative sizes for user 202, world 600, and each of content sectors 602, may not be to scale. The number of content sectors 602 included within world 600, the size of each content sector 602 in relation to the entire world 600 and in relation to user 202, and the amount of content of world 600 that user 202 may see within field of view 604 at any particular time may each be configured and changed as may serve a particular implementation.

As best illustrated by view 600-1 in FIG. 6A, world 600 may be formed from four partially overlapping content sectors 602 (i.e., content sectors 602-1, 602-2, 602-3, and 602-4) that are labeled around the outside of the ring of world 600. While world 600 is formed from four partially overlapping content sectors 602, it will be understood that any number of partially overlapping content sectors 602 may be used as may serve a particular embodiment. For example, for an immersive virtual reality world that includes a full 360-degree by 180-degree sphere, eight or twelve partially overlapping content sectors may be used.

Because content sectors 602 are partially overlapping with each other, each content sector includes three portions, as labeled inside the ring of world 600. First, each content sector 602 includes a portion of world 600 that is covered by that content sector 602 alone. Specifically, a content sector portion 602-1-only represents a portion of world 600 that is only covered by content sector 602-1, a content sector portion 602-2-only represents a portion of world 600 that is only covered by content sector 602-2, a content sector portion 602-3-only represents a portion of world 600 that is only covered by content sector 602-3, and a content sector portion 602-4-only represents a portion of world 600 that is only covered by content sector 602-4. Additionally, each content sector 602 includes portions of world 600 that are covered by that content sector 602 and are also covered by adjacent content sectors 602 on either side of that content sector 602 (i.e., due to the partially overlapping nature of content sectors 602). Specifically, a content sector portion 602-1-2 represents a portion of world 600 that is covered by the overlap of content sectors 602-1 and 602-2, a content sector portion 602-2-3 represents a portion of world 600 that is covered by the overlap of content sectors 602-2 and 602-3, a content sector portion 602-3-4 represents a portion of world 600 that is covered by the overlap of content sectors 602-3 and 602-4, and a content sector portion 602-4-1 represents a portion of world 600 that is covered by the overlap of content sectors 602-4 and 602-1.

Accordingly, as best illustrated by view 600-2 in FIG. 6B, user 202 may direct field of view 604 to any portion of any content sector 602 as user 202 experiences world 600. For example, as shown in FIG. 6B, user 202 may be directing field of view 604 to portion 602-1-only of content sector 602-1 of world 600. Accordingly, while field of view 604 is displayed on a display screen of device 400 (i.e., the device by which user 202 is experiencing world 600), device 400 may receive a stream of a first content file included in a plurality of content files managed by system 500 (i.e., the server remote from device 400 that provides data representative of world 600 to device 400 over the network).

Figure 7:
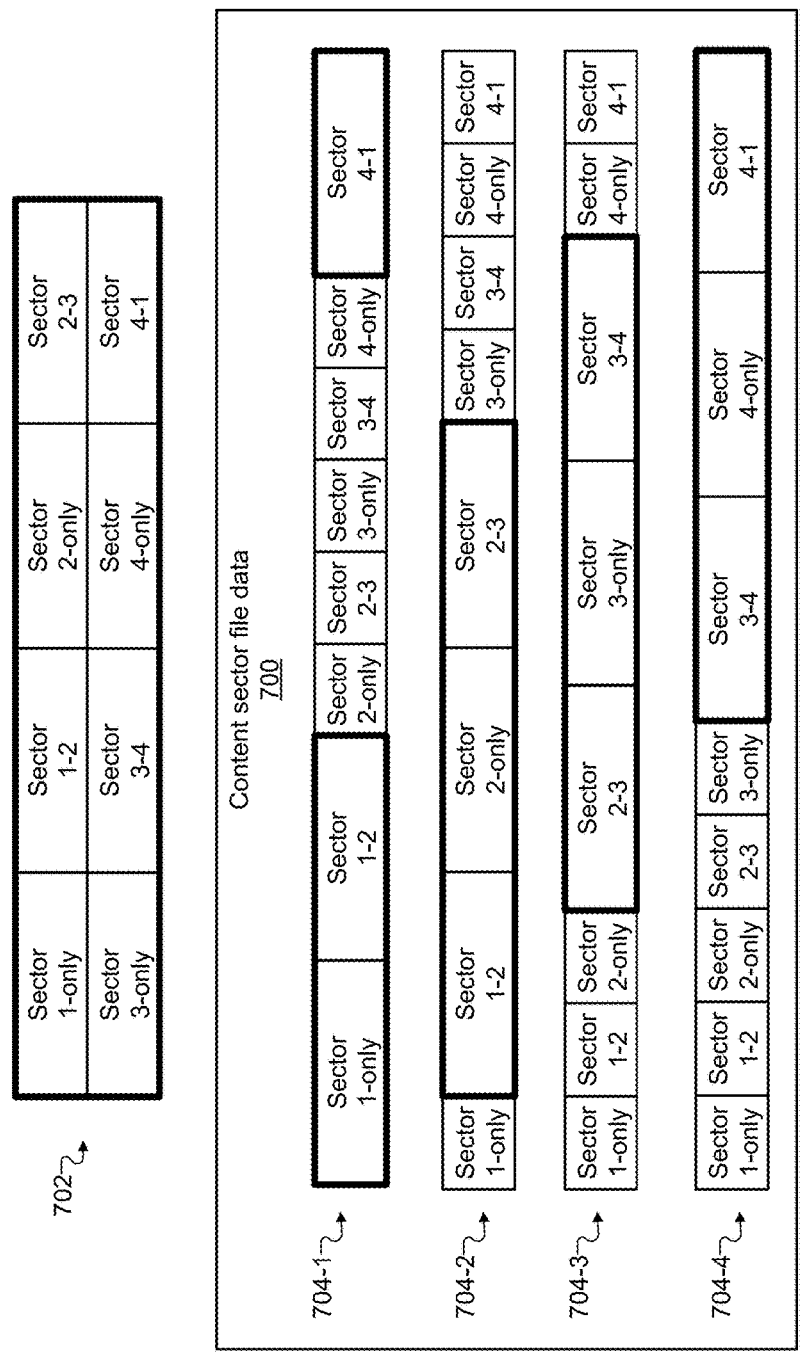
FIG. 7 illustrates exemplary content sector file data managed by the virtual reality media backend system of FIG. 5 according to principles described herein.

To illustrate, FIG. 7 shows exemplary content sector file data 700 (e.g., including the plurality of content files that includes the first content file being streamed to device 400) that may be managed by system 500. Content sector file data 700 may be stored and/or otherwise maintained on system 500 (e.g., incorporated with virtual reality content data 508 within storage facility 506 as described above in relation to FIG. 5). Alternatively, content sector file data 700 may include streaming data being received by system 500 that may not necessarily be stored or otherwise maintained on system 500 but may nonetheless be managed by system 500 in that system 500 may process and/or stream (e.g., pass through) data associated with content sector file data 700 to device 400 as the data is received.

In FIG. 7, a fully high-resolution content file 702 is illustrated outside of content sector file data 700. In some implementations, content file 702 may be stored, maintained, managed, used, and/or transmitted by system 500 (e.g., within content sector file data 700). Conversely, other implementations may have no use for content file 702, relying instead on partially high-resolution content files 704 (e.g., content files 704-1 through 704-4) that are stored, maintained, managed, used, and/or transmitted to device 400. Regardless of whether content file 702 is actually used in a particular implementation, however, content file 702 is useful to illustrate the efficiency of the methods and systems described herein. Specifically, content file 702 roughly illustrates an amount of data that may be required to represent an entirety of world 600 in a high resolution.

As used herein, a high resolution may refer to any measure of a detail level or quality level represented within an encoding of virtual reality media content. For example, high resolution may refer to a "high-definition" ("HD") image such as one that includes a particular number of rows or pixels or that is refreshed at a particular frame rate as may serve a particular implementation. Thus, as used herein, data encoded in a high resolution may be associated with a higher level of quality and/or detail than data encoded in a "low resolution," generating a more realistic-looking version of content of world 600 and/or a more desirable experience for user 202 experiencing world 600. However, data encoded in a high resolution may also utilize a larger amount of data (i.e., as compared with data encoded in a low resolution), which may necessitate more processing and network resources to process and transfer the high resolution data between system 500 and device 400.

For example, as indicated by the relative widths of the data representative of each of the content segment portions in content file 702, content file 702 may include a relatively large amount of detail and quality depicting the entirety of world 600. However, this detail may come at the cost of content file 702 including a large amount of data that must be processed and/or transferred to device 400. Content files 704, in contrast, illustrate a more efficient way that system 500 may provide high-resolution data to device 400. Because device 400 may only actually render content from one particular content sector 602 at a time, system 500 may manage four different content files 704 which may each include high-resolution data for just one of content sectors 602, while including lower resolution data for the other content sectors 602. Specifically, as indicated in FIG. 7 by the highlighting of particular content sectors and the relative widths of particular content sector portions, content file 704-1 may include high-resolution data for content sector 602-1 while including lower resolution (e.g., "standard-definition" ("SD")) data for the other content sectors 602 (e.g., for the portions of content sectors 602-2, 602-3, and 602-4 that do not overlap with content sector 602-1, including content sector portions 602-2-only, 602-2-3, 602-3-only, 602-3-4, and 602-4-only). Similarly, content file 704-2 may include high-resolution data for content sector 602-2 while including lower resolution data for the other content sectors 602, content file 704-3 may include high-resolution data for content sector 602-3 while including lower resolution data for the other content sectors 602, and content file 704-4 may include high-resolution data for content sector 602-4 while including lower resolution data for the other content sectors 602.

As illustrated, the content sector portions including data encoded in the low resolution are illustrated in content files 704 as being significantly narrower than the content sector portions including data encoded in the high resolution, indicating that the low resolution content sector portions include less data (i.e., less data to process and/or stream to device 400). As a result, content files 704 are each significantly narrower than content file 702, in which data representative of every content sector portion is encoded in the high resolution. Thus the relative widths of content file 702 and content files 704 reflect how much less data system 500 may need to process and/or transfer to device 400, illustrating the significant efficiency gains that system 500, device 400, and/or the network carrying the content files may obtain by using content files 704 rather than content file 702. It will be understood, however, that the relative widths of each content sector portion in content files 702 and 704 are drawn for illustrative purposes only and are not to scale. In other words, the relative widths shown in FIG. 7 may be larger or smaller than actual relative data amounts in various implementations of content files 702 and/or 704.

Figure 8:
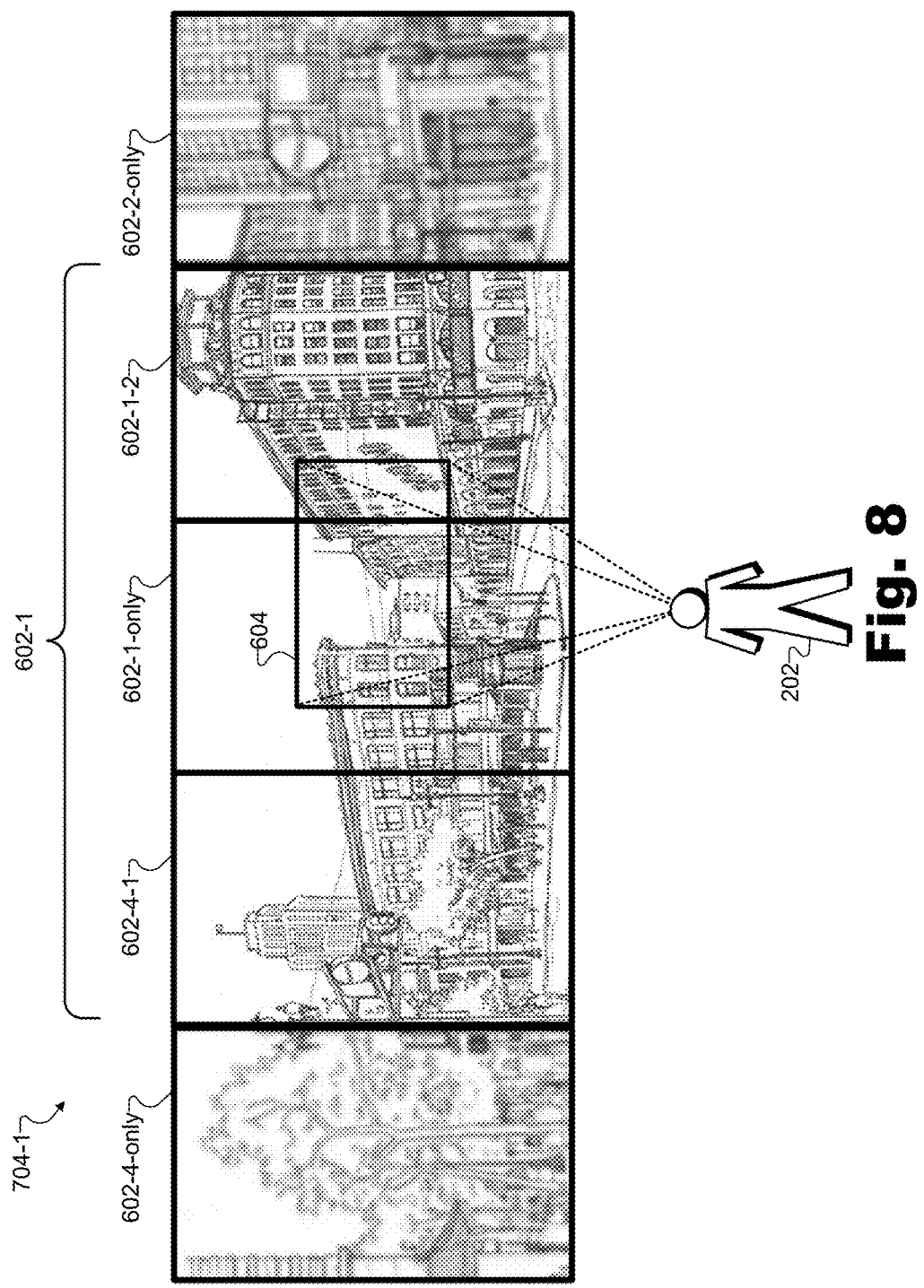
FIG. 8 illustrates content of the exemplary immersive virtual reality world of FIGS. 6A and 6B as the content may be represented within a particular content file within the content sector file data of FIG. 7 according to principles described herein.

To illustrate how the content of world 600 may be represented within content files 704, FIG. 8 illustrates a portion of the content of world 600 as the content may be represented within content file 704-1 within the content sector file data 700. Specifically, FIG. 8 shows the portion of the content of world 600 included within content sector 602-1, along with adjacent portions of the content of world 600 to content sector 602-1 (i.e., content included within content sector portions 602-4-only of content sector 602-4 and 602-2-only of content sector 602-2 as shown in FIG. 6A). FIG. 8 illustrates a portion of a 360-degree image depicting a city scene included within world 600 and being experienced by user 202 by way of field of view 604. Because device 400 is presenting world 600 for user 202 based on content file 704-1, all of the content included within field of view 604 in shown in high resolution. Similarly, as user 202 directs field of view 604 to other content included within content sector 602-1, device 400 will be able to render the content in high resolution based on data included within content file 704-1, as shown.

However, if user 202 directs field of view 604 to additional content that is included in another content sector (e.g., content sector 602-2) but not included in content sector 602-1 (e.g., content within content sector portion 602-2-only), device 400 will not be able to render the content in high resolution based on data included within content file 704-1. Specifically, as shown, content file 704-1 includes low-resolution data for content outside of content sector 602-1, as depicted by the lower quality (i.e., blurred) content displayed in content sector portions 602-2-only and 602-4-only. As a result, while content file 704-1 may provide high-resolution data as user 202 begins directing field of view 604 into a new content sector such as content sector 602-2 (i.e., within content sector portion 602-1-2 of content sector 602-2), when user 202 directs field of view 604 deeper into content sector 602-2 (i.e., to include content within content sector portion 602-2-only), device 400 may transmit a command to system 500 to switch from streaming content file 704-1 to device 400 to streaming content file 704-2 to device 400 (i.e., because content file 704-2 includes high-resolution data representative of content sector portion 602-2-only that content file 704-1 does not include). For example, in an implementation where device 400 received data representative of a plurality of URLs each corresponding to different content files 704, transmitting the command to switch from streaming content file 704-1 to streaming content file 704-2 may include selecting a URL corresponding to content file 704-2 from the plurality of URLs.

It will be recognized that it may take some time (e.g., up to a few seconds depending on network capabilities and/or other factors) for system 500 to receive the command to switch from streaming content file 704-1 to device 400 to streaming content file 704-2 to device 400. Hence, during this time (i.e., before device 400 begins receiving a stream of content file 704-2 from system 500), device 400 may render within field of view 604 the additional content included in content sector portion 602-2-only in the low resolution shown in FIG. 8 based on content file 704-1. In this way, user 202 may immediately be presented with the additional content from content sector portion 602-2-only without being subject to any lag or latency in the updating of field of view 604 while device 400 waits to receive content file 704-2 from system 500. As a result, system 500 may efficiently distribute data representative of the content of world 600 (e.g., by providing one of content files 704 rather than fully high-resolution content file 702), while any detraction of the immersiveness of the experience of user 202 in world 600 (e.g., caused by latent responsiveness of field of view 604) may be minimized and/or eliminated.

Subsequent to transmitting the command to system 500 (e.g., up to a few seconds after selecting a URL), device 400 may begin receiving the stream of content file 704-2 from system 500 over the network in place of receiving the stream of content file 704-1. As a result, device 400 may switch from rendering the additional content included within content sector portion 602-2-only in the low resolution based on content file 704-1 to rendering the additional content in the high resolution based on content file 704-2.

In certain implementations, it may be anticipated (e.g., by an operator of camera 102, by a content creator generating data for world 600, by system 500 while generating world 600 from data received by the content creator, etc.) that users are likely to direct the field of view in a certain direction at a particular time. For example, an object that the user is likely to watch may cross world 600 or another event may cause the user to turn to look in a different direction. If content sectors 602 are static relative to world 600, directing field of view 604 across a relatively wide arc of world 600 may include moving field of view 604 from one content sector 602 (e.g., content sector 602-1) to another (e.g., content sector 602-2). However, in certain implementations, one or more of content sectors 602 may be dynamic rather than static. For example, one or more content sectors 602 may persistently include (i.e., may follow or move along with) an image of a dynamic portion of world 600 that is configured to move within world 600 based on an event occurring within world 600 (i.e., an image of an object that is moving across world 600). As such, in these implementations, user 202 may direct field of view 604 across a relatively wide arc of world 600 but field of view 604 may remain within the same content sector 602 because the content sector 602 may also move across world 600 along approximately the same wide arc.

While world 600 has been illustrated and described as being ring-shaped and being formed from rectangular-shaped content sectors 602, it will be understood that world 600 and content sectors 602 may be any shapes that may serve a particular implementation. Moreover, content sectors 602 may partially intersect to form world 600 in any suitable way. For example, world 600 may be represented as a spherical structure within data representative of world 600 that is managed by system 500 (i.e. within content files 704 of content sector file data 700), and each content sector 602 that together forms world 600 may be a circular image of a portion of world 600.

Figure 9:
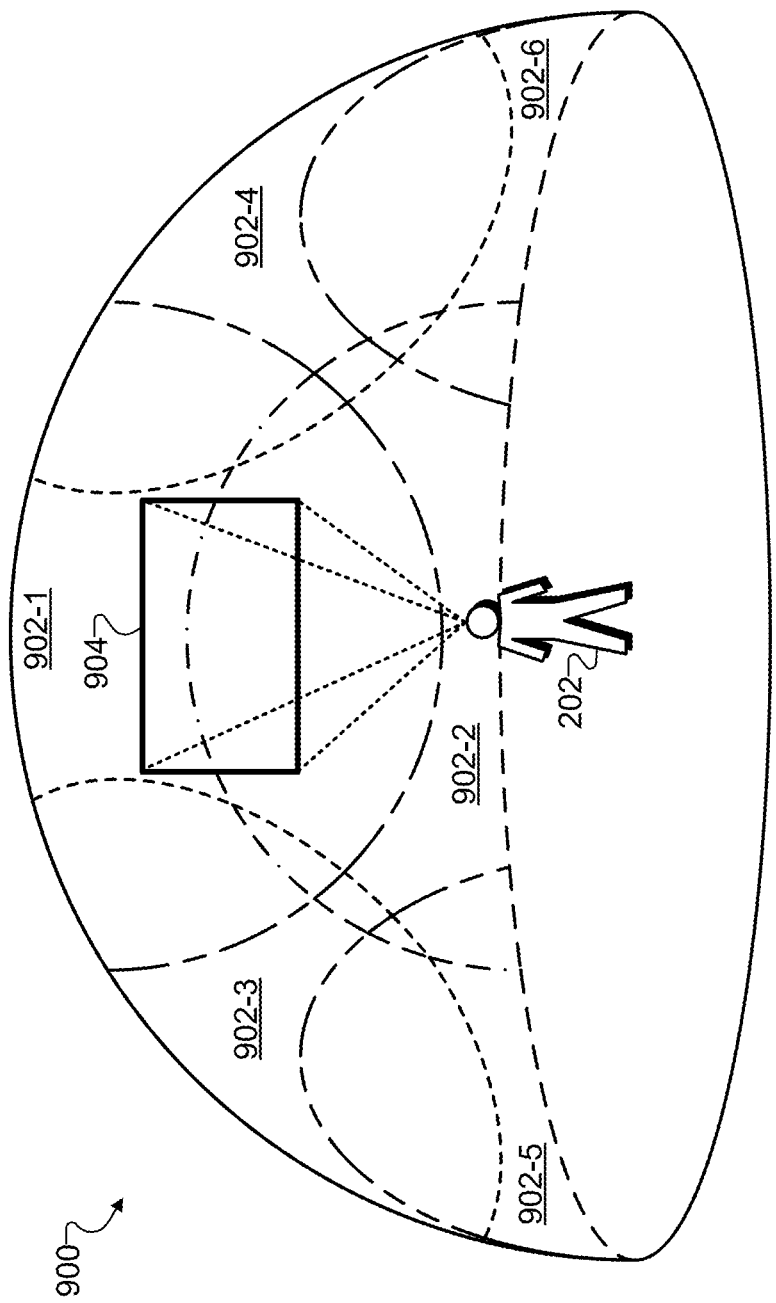
FIG. 9 illustrates an exemplary arrangement of a plurality of partially overlapping content sectors that together form an exemplary immersive virtual reality world according to principles described herein.

To illustrate, FIG. 9 illustrates an exemplary arrangement of a plurality of partially overlapping content sectors that together form an exemplary immersive virtual reality world 900 ("world 900"). In contrast to the ring-shaped world 600 of FIGS. 6A and 6B, world 900 is illustrated as being semi-spherical (i.e. a 360-degree by 90-degree semi-sphere) and thus includes a more complex arrangement of partially overlapping content sectors. While a semi-spherical world 900 is shown for clarity of illustration and description, it will be understood that world 900 may include a fully-spherical world (i.e., a 360-degree by 180-degree sphere) using the same principles illustrated in FIG. 9.

As shown, world 900 is formed from an arrangement of a plurality of partially overlapping content sectors 902 (e.g., content sectors 902-1 through 902-6). Content sectors 902 may partially overlap one another in a more complex arrangement than content sectors 602 of FIGS. 6A and 6B. For example, content sector 902-1 includes content sector portions that overlap with content sector 902-2, content sector 902-3, and content sector 902-4. Additionally, certain content sector portions of content sector 902-1 overlap with multiple other content sectors such as with both content sectors 902-2 and 902-3 or with both content sectors 902-2 and 902-4. As such, device 400 (e.g., management facility 402) may include more complex logic to determine what content file should be requested from system 500. However, content sectors 902 may be configured so that content being rendered within field of view 904 is always included within at least one content sector 902 such that device 400 may always select a content file corresponding to a content sector 902 that includes the content being rendered within field of view 904.

Figure 10A:
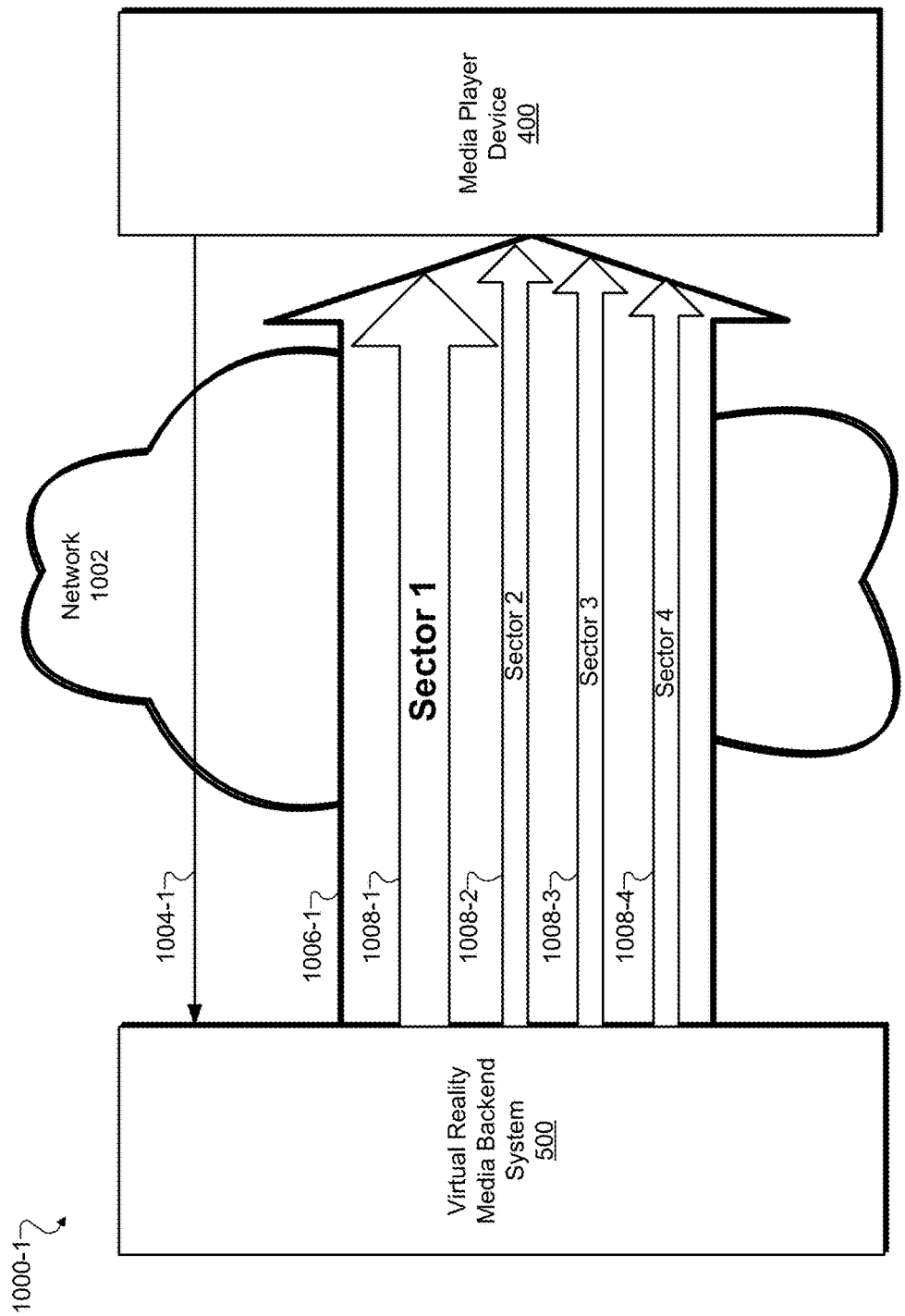

FIGS. 10A, 10B and 10C illustrate exemplary configurations 1000 (e.g., configurations 1000-1, 1000-2, and 1000-3, respectively) in which system 500 and device 400 operate to facilitate efficient distribution of virtual reality media content. Specifically, each of configurations 1000 illustrates communication over a network 1002 that includes a command 1004 (e.g., commands 1004-1, 1004-2, and 1004-3, respectively) from device 400 to system 500 to switch from streaming a particular content file 1006 (e.g., content files 1006-1, 1006-2, and 1006-3, respectively) to streaming a different content file 1006. As described above, command 1004 may include selecting, by device 400 based on user input from a user of device 400, a URL corresponding to the different content file 1006 from a plurality of URLs corresponding to various content files managed by system 500. Content files 1006 may be similar to content files 704, as described above in relation to FIG. 7. Specifically, each content file 1006 may include data representative of content included within each content sector 1008 (e.g., of just four content sectors 1008-1 through 1008-4 included in this example) encoded at different resolutions.

For example, as illustrated by the differently-sized arrows representative of content sectors 1008, content file 1006-1 of FIG. 10A may include data representative of content sector 1008-1 encoded in a high resolution (e.g., an HD resolution) and data representative of content sectors 1008-2, 1008-3, and 1008-4 (e.g., content sector portions of content sectors 1008-2, 1008-3, and 1008-4 that do not overlap with content sector 1008-1) encoded in one or more lower resolutions. For example, data representative of certain content sectors 1008 (e.g., content sectors 1008 that are adjacent to content sector 1008-1) may be encoded in a first lower resolution (e.g., an SD resolution) while other content sectors 1008 (e.g., content sectors 1008 that are not adjacent to content sector 1008-1) may be encoded in a second lower resolution that is even lower than the first lower resolution. Similarly, content file 1006-2 of FIG. 10B may include data representative of content sector 1008-2 encoded in the high resolution and data representative of content sectors 1008-1, 1008-3, and 1008-4 (e.g., content sector portions of content sectors 1008-1, 1008-3, and 1008-4 that do not overlap with content sector 1008-2) encoded in the one or more lower resolutions. Likewise, content file 1006-3 of FIG. 10C may include data representative of content sector 1008-3 encoded in the high resolution and data representative of content sectors 1008-1, 1008-2, and 1008-4 (e.g., content sector portions of content sectors 1008-1, 1008-2, and 1008-4 that do not overlap with content sector 1008-3) encoded in the one or more lower resolutions.

Accordingly, in one example illustrated by FIG. 10A, device 400 may render a field of view of an immersive virtual reality world based on content file 1006-1. For example, the field of view may include content from content sector 1008-1, for which high-resolution data is included within content file 1006-1. Device 400 may detect user input representative of a request to shift additional content included in content sector 1008-2 but not included in content sector 1008-1 into the field of view in place of the content from content sector 1008-1. In response to the user input, device 400 may transmit command 1004-1 to system 500 to request that system 500 switch from streaming content file 1006-1 to streaming content file 1006-2 (i.e., because content file 1006-2 includes high-resolution data representative of the additional content included in content sector 1008-2).

Before device 400 begins receiving a stream of content file 1006-2 from system 500 over network 1002, device 400 may temporarily render, based on the data included in content file 1006-1 and while device 400 is still receiving content file 1006-1 instead of content file 1006-2 during the time it takes for system 500 to begin streaming content file 1006-2, the additional content included in content sector 1008-2 in the low resolution. However, once device 400 begins receiving the stream of content file 1006-2 from system 500 over network 1002 in place of receiving the stream of content file 1006-1 (e.g., as illustrated in FIG. 10B), device 400 may switch from rendering the additional content included in content sector 1008-2 in the low resolution based on content file 1006-1 of FIG. 10A to rendering the additional content included in content sector 1008-2 in the high resolution based on content file 1006-2 of FIG. 10B.

From there, the user may continue to experience different parts of the immersive virtual reality world and, as a result, may continue to trigger device 400 to switch from receiving one content file to another in order to always have high-resolution data representative of content in the field of view. For example, the user may direct the field of view to switch from displaying content in content sector 1008-2 to displaying content in a different content such as content sector 1008-3, or may direct the field of view to switch from displaying content in content sector 1008-2 back to displaying content in content sector 1008-1.

To illustrate, the example above beginning at FIG. 10A and moving to FIG. 10B may continue. Specifically, subsequent to switching to rendering the additional content in the high resolution based on content file 1006-2 as shown in FIG. 10B, device 400 may detect additional user input representative of a request to shift other additional content included in content sector 1008-3 but not included in content sector 1008-2 into the field of view in place of the additional content included in content sector 1008-2. In response to the additional user input, device 400 may transmit command 1004-2 to system 500 to switch from streaming content file 1006-2 to device 400 over network 1002 to streaming content file 1006-3 (i.e., because content file 1006-3 includes high-resolution data representative of the other additional content included in content sector 1008-3). Before device 400 begins receiving a stream of content file 1006-3 from system 500 over network 1002, device 400 may temporarily render, based on the data included in content file 1006-2 and while device 400 is still receiving content file 1006-2 instead of content file 1006-3 during the time it takes for system 500 to begin streaming content file 1006-3, the other additional content included in content sector 1008-3 in the low resolution. However, once device 400 begins receiving the stream of content file 1006-3 from system 500 over network 1002 in place of receiving the stream of content file 1006-2 (e.g., as illustrated in FIG. 10C), device 400 may switch from rendering the other additional content included in content sector 1008-3 in the low resolution based on content file 1006-2 of FIG. 10B to rendering the additional content included in content sector 1008-3 in the high resolution based on content file 1006-3 of FIG. 10C.

Alternatively, subsequent to switching to rendering the additional content in the high resolution based on content file 1006-2 as shown in FIG. 10B, device 400 may detect additional user input representative of a request to shift other additional content included in content sector 1008-1 but not included in content sector 1008-2 into the field of view in place of the additional content included in content sector 1008-2. In response to the additional user input, device 400 may transmit command 1004-2 to system 500 to switch from streaming content file 1006-2 to device 400 over network 1002 to streaming content file 1006-1 (i.e., because content file 1006-1 includes high-resolution data representative of the other additional content included in content sector 1008-1). Before device 400 begins to again receive the stream of content file 1006-1 from system 500 over network 1002, device 400 may temporarily render, based on the data included in content file 1006-2 and while device 400 is still receiving content file 1006-2 instead of content file 1006-1 during the time it takes for system 500 to begin streaming content file 1006-1 again, the other additional content included in content sector 1008-1 in the low resolution. However, once device 400 begins to again receive the stream of content file 1006-1 from system 500 over network 1002 in place of receiving the stream of content file 1006-2 (e.g., as illustrated in FIG. 10A), device 400 may switch from rendering the other additional content included in content sector 1008-1 in the low resolution based on content file 1006-2 of FIG. 10B to rendering the additional content included in content sector 1008-1 in the high resolution based on content file 1006-1 of FIG. 10A.

Figure 11:
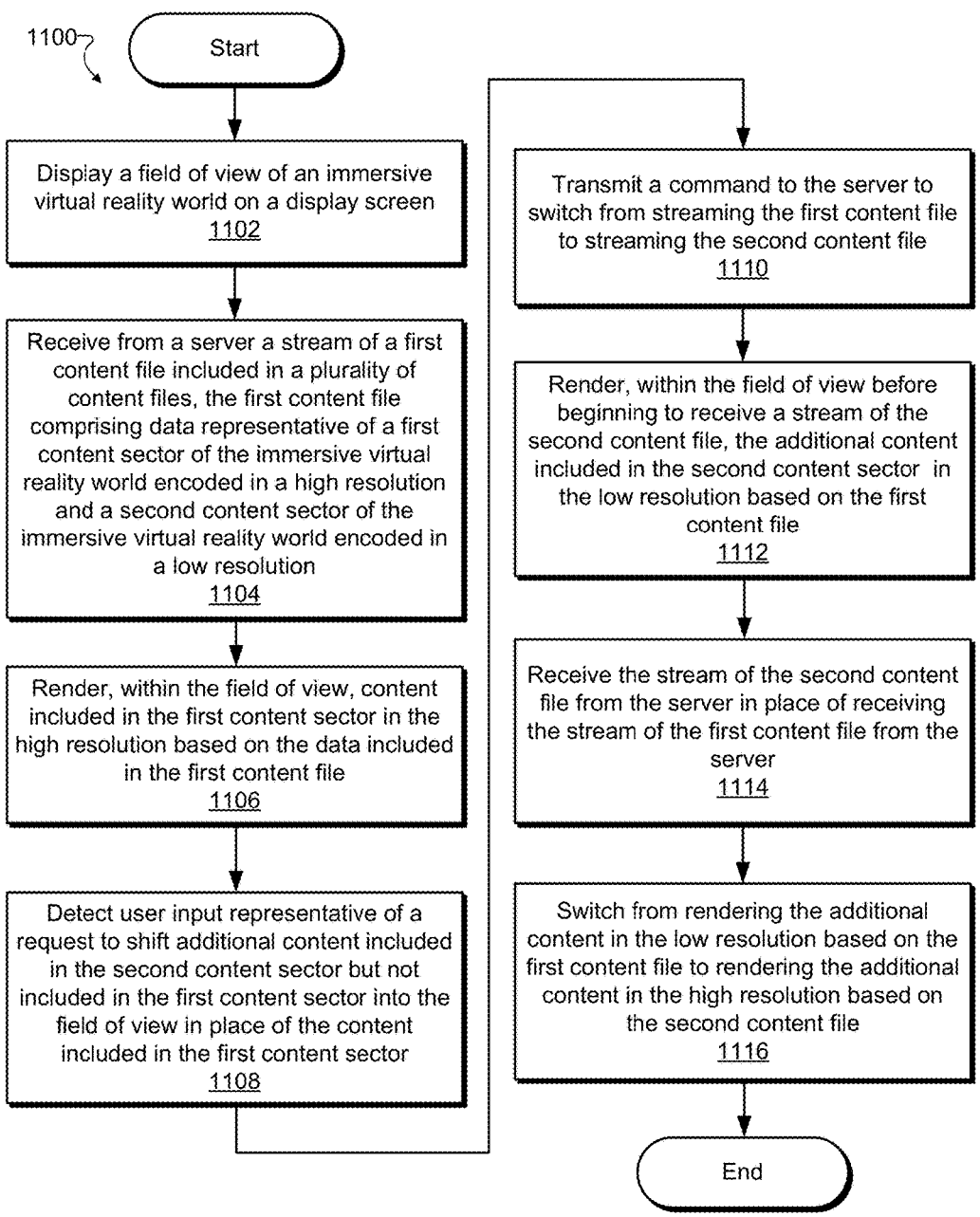
FIGS. 11 and 12 illustrate exemplary methods for efficient distribution of virtual reality media content according to principles described herein.

FIG. 11 illustrates an exemplary method 1100 of efficient distribution of virtual reality media content. While FIG. 11 illustrates exemplary operations according to one embodiment, other embodiments may omit, add to, reorder, and/or modify any of the operations shown in FIG. 11. One or more of the operations shown in FIG. 11 may be performed by media player device 400 and/or any implementation thereof.

In operation 1102, a media player device may display a field of view of an immersive virtual reality world on a display screen. Operation 1102 may be performed in any of the ways described herein.

In operation 1104, the media player device may receive a stream of a first content file included in a plurality of content files managed by a server remote from the media player device. For example, the media player device may receive the stream of the first content file over a network from the server while the field of view is displayed on the display screen of the media player device. Additionally, the plurality of content files managed by the server may further include a second content file, and each content file in the plurality of content files may comprise data representative of a plurality of partially overlapping content sectors that together form the immersive virtual reality world. In some examples, the plurality of partially overlapping content sectors included within each content file may include a first content sector and a second content sector. The first content file may comprise data representative of the first content sector encoded in a high resolution and the second content sector encoded in a low resolution. For example, the low resolution may be any resolution that is lower than the high resolution. Conversely, the second content file may comprise data representative of the first content sector encoded in the low resolution and the second content sector encoded in the high resolution. Operation 1104 may be performed in any of the ways described herein.

In operation 1106, the media player device may render content included in the first content sector in the high resolution based on the data included in the first content file. For example, the media player device may render the content within the field of view while the stream of the first content file is being received by the media player device. Operation 1106 may be performed in any of the ways described herein.

In operation 1108, the media player device may detect user input provided by a user of the media player device. For example, the user input may be representative of a request to shift additional content included in the second content sector but not included in the first content sector into the field of view in place of the content included in the first content sector. Operation 1108 may be performed in any of the ways described herein.

In operation 1110, the media player device may transmit a command to the server to switch from streaming the first content file to the media player device over the network to streaming the second content file to the media player device over the network. Operation 1110 may be performed in any of the ways described herein.

In operation 1112, the media player device may render the additional content included in the second content sector in the low resolution based on the data included in the first content file. For example, the media player device may render the additional content within the field view before the media player device begins receiving a stream of the second content file from the server over the network. Operation 1112 may be performed in any of the ways described herein.

In operation 1114, the media player device may receive the stream of the second content file from the server over the network subsequent to transmitting the command to the server. In some examples, the media player device may receive the stream of the second content file from the server over the network in place of receiving the stream of the first content file from the server over the network. Operation 1114 may be performed in any of the ways described herein.

In operation 1116, the media player device may switch from rendering the additional content included in the second content sector in the low resolution based on the first content file to rendering the additional content included in the second content sector in the high resolution based on the second content file. For example, the media player device may switch to rendering the additional content in the high resolution based on the second content file in response to the receiving of the stream of the second content file. Operation 1116 may be performed in any of the ways described herein.

Figure 12:
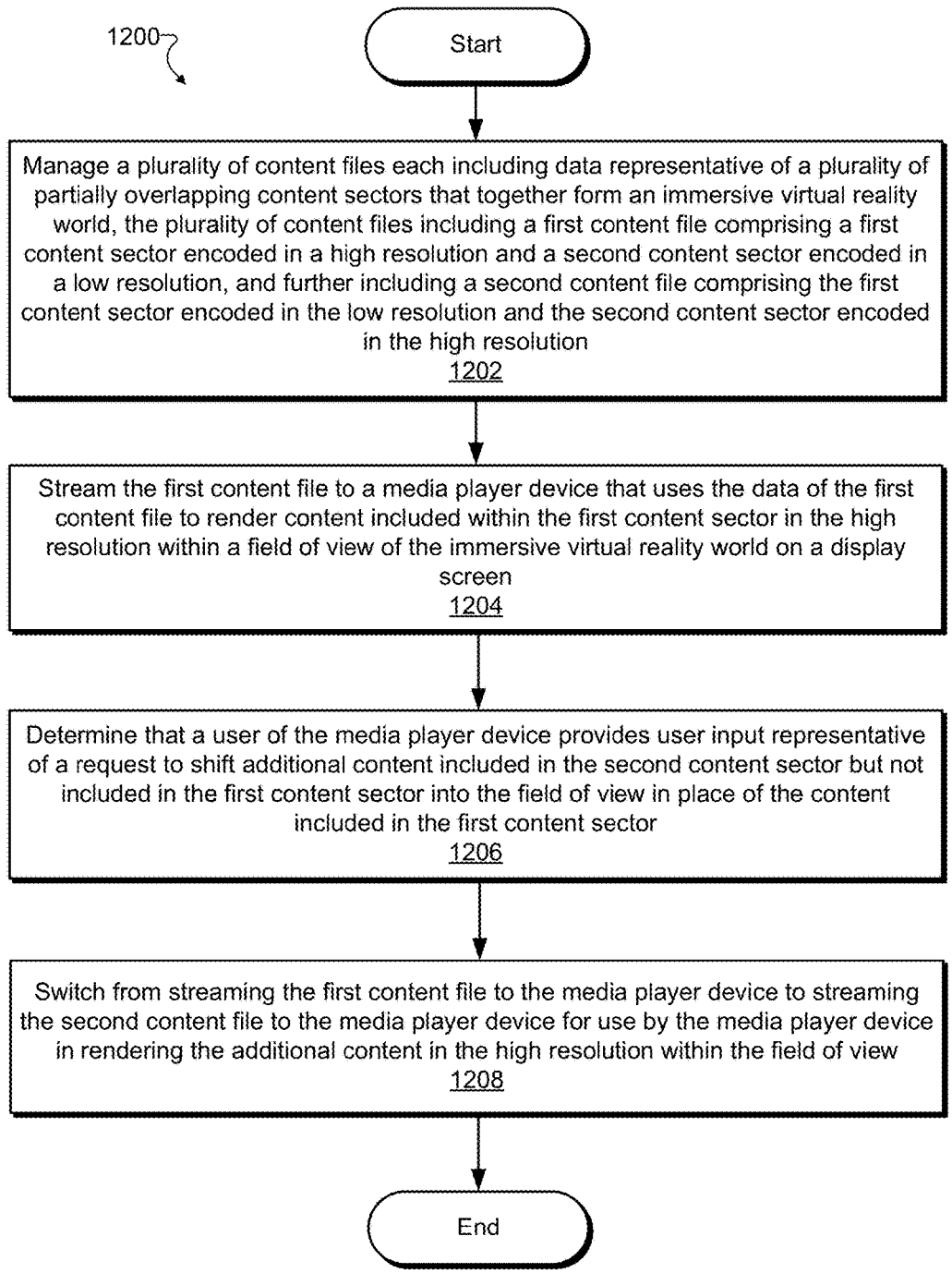

FIG. 12 illustrates an exemplary method 1200 of efficient distribution of virtual reality media content. While FIG. 12 illustrates exemplary operations according to one embodiment, other embodiments may omit, add to, reorder, and/or modify any of the operations shown in FIG. 12. One or more of the operations shown in FIG. 12 may be performed by virtual reality media backend system 500 and/or any implementation thereof.

In operation 1202, a virtual reality media backend system may manage a plurality of content files each including data representative of a plurality of partially overlapping content sectors that together form an immersive virtual reality world. In some examples, the plurality of content files may include a first content file that comprises data representative of a first content sector included in the plurality of partially overlapping content sectors and encoded in a high resolution and a second content sector included in the plurality of partially overlapping content sectors and encoded in a low resolution. The low resolution may be any resolution that is lower than the high resolution. The plurality of content files may also include a second content file that comprises data representative of the first content sector encoded in the low resolution and the second content sector encoded in the high resolution. Operation 1202 may be performed in any of the ways described herein.

In operation 1204, the virtual reality media backend system may stream the first content file over a network to a media player device that is remote from the virtual reality media backend system. For example, the virtual reality media backend system may stream the first content file while the media player device is rendering content within a field of view of the immersive virtual reality world that is displayed by the media player device on a display screen. The content being rendered by the media player device may be included in the first content sector and may thus be rendered by the media player device in the high resolution based on the data included in the first content file that the virtual reality media backend system may be streaming to the media player device. Operation 1204 may be performed in any of the ways described herein.

In operation 1206, the virtual reality media backend system may determine that a user of the media player device provides user input representative of a request to shift additional content into the field of view in place of the content included in the first content sector. For example, the additional content may be included in the second content sector but not included in the first content sector. Operation 1206 may be performed in any of the ways described herein. For example, operation 1206 may deter that the user provides the user input by receiving a command from the media player device to stream the second content file rather than the first content file.

In operation 1208, the virtual reality media backend system may switch from streaming the first content file to the media player device to streaming the second content file to the media player device. For example, the virtual reality media backend system may switch from streaming the first content file to streaming the second content file in response to the determining in operation 1206 that the user of the media player device provides the user input. In some examples, the second content file streamed by the virtual reality backend system after the switching of operation 1208 may be used by the media player device in rendering the additional content in the high resolution within the field of view. Operation 1208 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 13:
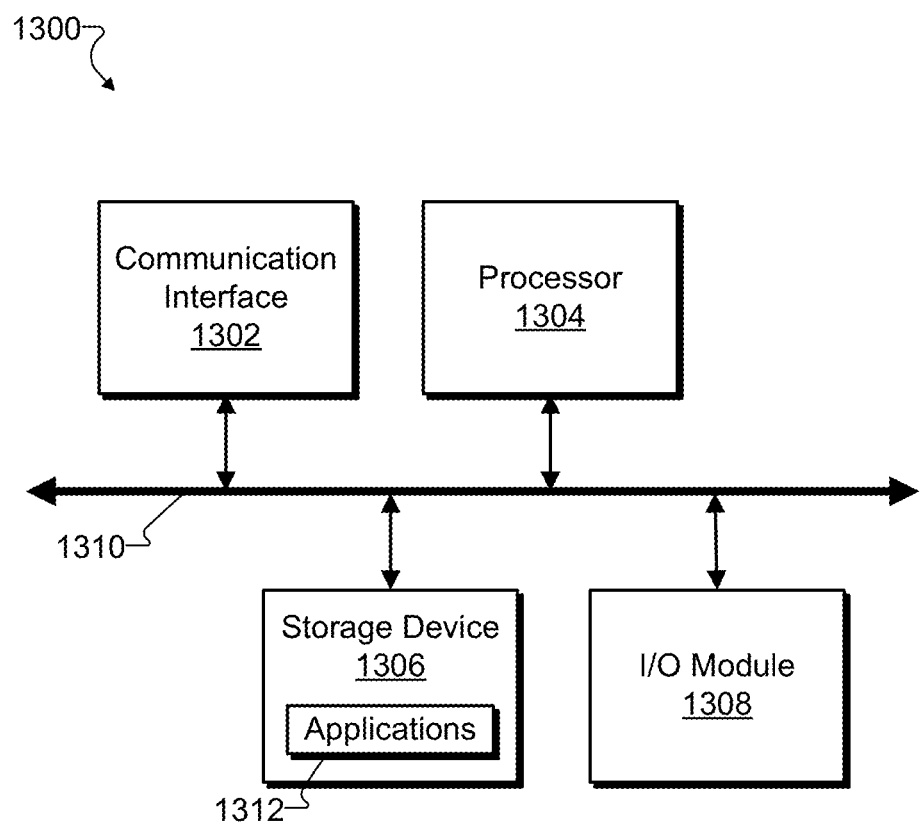
FIG. 13 illustrates an exemplary computing device according to principles described herein.

FIG. 13 illustrates an exemplary computing device 1300 that may be specifically configured to perform one or more of the processes described herein. As shown in FIG. 13, computing device 1300 may include a communication interface 1302, a processor 1304, a storage device 1306, and an input/output ("I/O") module 1308 communicatively connected via a communication infrastructure 1310. While an exemplary computing device 1300 is shown in FIG. 13, the components illustrated in FIG. 13 are not intended to be limiting. Additional or alternative components may be used in other embodiments. Components of computing device 1300 shown in FIG. 13 will now be described in additional detail.

Communication interface 1302 may be configured to communicate with one or more computing devices. Examples of communication interface 1302 include, without limitation, a wired network interface (such as a network interface card), a wireless network interface (such as a wireless network interface card), a modem, an audio/video connection, and any other suitable interface.

Processor 1304 generally represents any type or form of processing unit capable of processing data or interpreting, executing, and/or directing execution of one or more of the instructions, processes, and/or operations described herein. Processor 1304 may direct execution of operations in accordance with one or more applications 1312 or other computer-executable instructions such as may be stored in storage device 1306 or another computer-readable medium.

Storage device 1306 may include one or more data storage media, devices, or configurations and may employ any type, form, and combination of data storage media and/or device. For example, storage device 1306 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1306. For example, data representative of one or more executable applications 1312 configured to direct processor 1304 to perform any of the operations described herein may be stored within storage device 1306. In some examples, data may be arranged in one or more databases residing within storage device 1306.

I/O module 1308 may be configured to receive user input and provide user output and may include any hardware, firmware, software, or combination thereof supportive of input and output capabilities. For example, I/O module 1308 may include hardware and/or software for capturing user input, including, but not limited to, a keyboard or keypad, a touchscreen component (e.g., touchscreen display), a receiver (e.g., an RF or infrared receiver), and/or one or more input buttons.

I/O module 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1308 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1300. For example, one or more applications 1312 residing within storage device 1306 may be configured to direct processor 1304 to perform one or more processes or functions associated with management facility 402 of device 400 (see FIG. 4) and/or with management facility 502 of system 500 (see FIG. 5). Likewise, storage facility 404 of device 400 and/or storage facility 504 of system 500 may be implemented by or within storage device 1306.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
 displaying, by a media player device on a display screen, a field of view of an immersive virtual reality world;
 receiving, by the media player device over a network from a server remote from the media player device, data representative of a plurality of uniform resource locators ("URLs") that each correspond to a different content file included in a plurality of content files managed by the server, wherein
  each content file in the plurality of content files comprises data representative of a plurality of partially overlapping content sectors that together form a 360-degree image of the immersive virtual reality world, the plurality of partially overlapping content sectors included within each content file including a first content sector and a second content sector,
  the plurality of content files managed by the server includes respective content files associated with each particular content sector, the particular content sector with which a respective content file is associated being encoded in a high resolution within the respective content file while a remainder of the immersive virtual reality world not included in the particular content sector is encoded in a low resolution lower than the high resolution, and the content sectors in the plurality of partially overlapping content sectors are dynamic content sectors that move along with an event occurring within the immersive virtual reality world such that the first content sector persistently depicts a dynamic portion of the immersive virtual reality world to which it is anticipated that a user of the media player device is likely to direct the field of view as the dynamic portion moves within the immersive virtual reality world;

receiving, by the media player device over the network from the server and while the field of view is displayed on the display screen of the media player device, a stream of a first content file that is included in the plurality of content files and is associated with the first content sector such that the first content sector is encoded in the high resolution and the second content sector is encoded in the low resolution;

rendering, by the media player device within the field of view while the stream of the first content file is being received by the media player device and based on the data included in the first content file, content included in the first content sector in the high resolution;

detecting, by the media player device, user input provided by the user of the media player device and representative of a request to shift additional content included in the second content sector but not included in the first content sector into the field of view in place of the content included in the first content sector; and in response to the user input transmitting, by the media player device, a command to the server to switch from streaming the first content file to streaming a second content file that is included in the plurality of content files and is associated with the second content sector such that the second content sector is encoded in the high resolution and the first content sector is encoded in the low resolution, the transmitting comprising selecting, from the plurality of URLs, a particular URL corresponding to the second content file, rendering, by the media player device within the field view before the media player device begins receiving a stream of the second content file from the server over the network and based on the data included in the first content file, the additional content included in the second content sector in the low resolution, receiving, by the media player device subsequent to transmitting the command to the server, the stream of the second content file from the server over the network in place of receiving the stream of the first content file from the server over the network, and switching, by the media player device in response to the receiving of the stream of the second content file, from rendering the additional content included in the second content sector in the low resolution based on the first content file to rendering the additional content included in the second content sector in the high resolution based on the second content file.

2. The method of claim 1, wherein the immersive virtual reality world is generated based on data representative of camera-captured real-world scenery, the data representative of the camera-captured real-world scenery captured by at least one video camera arranged to capture a 360-degree image of the real-world scenery around a center point corresponding to the video camera.

3. The method of claim 1, wherein:

the plurality of content files managed by the server further includes a third content file and the plurality of URLs includes a particular URL corresponding to the third content file;

the plurality of partially overlapping content sectors included within each content file in the plurality of content files further includes a third content sector;

the second content file further comprises data representative of the third content sector encoded in the low resolution;

the third content file comprises data representative of the third content sector encoded in the high resolution, the first content sector encoded in the low resolution, and the second content sector encoded in the low resolution; and the method further comprises detecting, by the media player device subsequent to the switching from rendering the additional content in the low resolution based on the first content file to rendering the additional content in the high resolution based on the second content file, additional user input provided by the user and representative of a request to shift other additional content included in the third content sector but not included in the second content sector into the field of view in place of the additional content included in the second content sector, and in response to the additional user input transmitting, by the media player device, an additional command to the server to switch from streaming the second content file to streaming the third content file by selecting, from the plurality of URLs, the particular URL corresponding to the third content file, rendering, by the media player device within the field view before the media player device begins receiving a stream of the third content file from the server over the network and based on the data included in the second content file, the other additional content included in the third content sector in the low resolution, receiving, by the media player device subsequent to transmitting the additional command to the server, the stream of the third content file from the server over the network in place of receiving the stream of the second content file from the server over the network, and switching, by the media player device in response to the receiving of the stream of the third content file, from rendering the other additional content included in the third content sector in the low resolution based on the second content file to rendering the other additional content included in the third content sector in the high resolution based on the third content file.

4. The method of claim 1, further comprising:

detecting, by the media player device, additional user input provided by the user representative of a request to shift other additional content included in the first content sector but not included in the second content sector into the field of view in place of the additional content included in the second content sector; and in response to the additional user input transmitting, by the media player device, an additional command to the server to switch back from streaming the second content file to streaming the first content file by selecting, from the plurality of URLs, a particular URL corresponding to the first content file, rendering, by the media player device within the field view before the media player device begins to again receive the stream of the first content file from the server over the network and based on the data included in the second content file, the other additional content included in the first content sector in the low resolution, receiving, by the media player device subsequent to transmitting the additional command to the server, the stream of the first content file from the server over the network in place of receiving the stream of the second content file from the server over the network, and switching, by the media player device in response to the receiving of the stream of the first content file, from rendering the other additional content included in the first content sector in the low resolution based on the second content file to rendering the other additional content included in the first content sector in the high resolution based on the first content file.

5. The method of claim 1, embodied as computer-executable instructions on at least one non-transitory computer readable medium.

6. A method comprising:

managing, by a virtual reality media backend system, a plurality of content files each including data representative of a plurality of partially overlapping content sectors that together form a 360-degree image of an immersive virtual reality world, wherein the plurality of content files includes respective content files associated with each particular content sector, the particular content sector with which a respective content file is associated being encoded in a high resolution within the respective content file while a remainder of the immersive virtual reality world not included in the particular content sector is encoded in a low resolution lower than the high resolution, the content sectors in the plurality of partially overlapping content sectors are dynamic content sectors that move along with an event occurring within the immersive virtual reality world such that the first content sector persistently depicts a dynamic portion of the immersive virtual reality world to which it is anticipated that a user of the media player device is likely to direct the field of view as the dynamic portion moves within the immersive virtual reality world;

providing, by the virtual reality media backend system over a network to a media player device that is remote from the virtual reality media backend system, data representative of a plurality of uniform resource locators ("URLs") that each correspond to a different content file in the plurality of content files;

streaming, by the virtual reality media backend system over the network to the media player device, a first content file that is included in the plurality of content files and is associated with the first content sector such that the first content sector is encoded in the high resolution and the second content sector is encoded in the low resolution, wherein while the first content file is streamed to the media player device, the media player device renders, based on the data included in the first content file, content included the first content sector in the high resolution within a field of view of the immersive virtual reality world that is displayed by the media player device on a display screen;

determining, by the virtual reality media backend system, that the user of the media player device provides user input representative of a request to shift additional content included in the second content sector but not included in the first content sector into the field of view in place of the content included in the first content sector, the determining performed based on a selection, by the media player device from the plurality of URLs, of a particular URL corresponding to a second content file that is included in the plurality of content files and is associated with the second content sector such that the second content sector is encoded in the high resolution and the first content sector is encoded in the low resolution; and switching, by the virtual reality media backend system in response to the determining that the user of the media player device provides the user input, from streaming the first content file to the media player device to streaming the second content file to the media player device for use by the media player device in rendering the additional content in the high resolution within the field of view.

7. The method of claim 6, wherein the immersive virtual reality world is generated based on data representative of camera-captured real-world scenery, the data representative of the camera-captured real-world scenery captured by at least one video camera arranged to capture a 360-degree image of the real-world scenery around a center point corresponding to the video camera.

8. The method of claim 6, wherein:

the immersive virtual reality world is represented as a spherical structure within the plurality of content files managed by the virtual reality media backend system; and each content sector in the plurality of partially overlapping content sectors that together form the immersive virtual reality world is a circular image of a portion of the immersive virtual reality world.

9. The method of claim 6, embodied as computer-executable instructions on at least one non-transitory computer readable medium.

10. A media player device comprising:

a display screen; and at least one physical computing device that:

displays, on the display screen, a field of view of an immersive virtual reality world;

receives, over a network from a server remote from the media player device, data representative of a plurality of uniform resource locators ("URLs") that each correspond to a different content file included in a plurality of content files managed by the server, wherein each content file in the plurality of content files comprises data representative of a plurality of partially overlapping content sectors that together form a 360-degree image of the immersive virtual reality world, the plurality of partially overlapping content sectors included within each content file including a first content sector and a second content sector, the plurality of content files managed by the server further includes respective content files associated with each particular content sector, the particular content sector with which a respective content file is associated being encoded in a high resolution within the respective content file while a remainder of the immersive virtual reality world not included in the particular content sector is encoded in a low resolution lower than the high resolution, and the content sectors in the plurality of partially overlapping content sectors are dynamic content sectors that move along with an event occurring within the immersive virtual reality world such that the first content sector persistently depicts a dynamic portion of the immersive virtual reality world to which it is anticipated that a user of the media player device is likely to direct the field of view as the dynamic portion moves within the immersive virtual reality world;

receives, over the network from the server and while the field of view is displayed on the display screen of the media player device, a stream of a first content file that is included in the plurality of content files and is associated with the first content sector such that the first content sector is encoded in the high resolution and the second content sector is encoded in the low resolution, renders, within the field of view while the stream of the first content file is being received by the media player device and based on the data included in the first content file, content included in the first content sector in the high resolution;

detects user input provided by the user of the media player device and representative of a request to shift additional content included in the second content sector but not included in the first content sector into the field of view in place of the content included in the first content sector; and in response to the user input transmits a command to the server to switch from streaming the first content file to streaming a second content file that is included in the plurality of content files and is associated with the second content sector such that the second content sector is encoded in the high resolution and the first content sector is encoded in the low resolution, the transmitting comprising selecting, from the plurality of URLs, a particular URL corresponding to the second content file, renders, within the field view before the media player device begins receiving a stream of the second content file from the server over the network and based on the data included in the first content file, the additional content included in the second content sector in the low resolution, receives, subsequent to transmitting the command to the server, the stream of the second content file from the server over the network in place of receiving the stream of the first content file from the server over the network, and switches, in response to the receiving of the stream of the second content file, from rendering the additional content included in the second content sector in the low resolution based on the first content file to rendering the additional content included in the second content sector in the high resolution based on the second content file.

11. The media player device of claim 10, wherein the immersive virtual reality world is generated based on data representative of camera-captured real-world scenery, the data representative of the camera-captured real-world scenery captured by at least one video camera arranged to capture a 360-degree image of the real-world scenery around a center point corresponding to the video camera.

12. The media player device of claim 10, wherein:

the plurality of content files managed by the server further includes a third content file and the plurality of URLs includes a particular URL corresponding to the third content file;

the plurality of partially overlapping content sectors included within each content file in the plurality of content files further includes a third content sector;

the second content file further comprises data representative of the third content sector encoded in the low resolution;

the third content file comprises data representative of the third content sector encoded in the high resolution, the first content sector encoded in the low resolution, and the second content sector encoded in the low resolution; and the at least one physical computing device further detects, subsequent to the switching from rendering the additional content in the low resolution based on the first content file to rendering the additional content in the high resolution based on the second content file, additional user input provided by the user and representative of a request to shift other additional content included in the third content sector but not included in the second content sector into the field of view in place of the additional content included in the second content sector, and in response to the additional user input transmits an additional command to the server to switch from streaming the second content file to streaming the third content file by selecting, from the plurality of URLs, the particular URL corresponding to the third content file, renders, within the field view before the media player device begins receiving a stream of the third content file from the server over the network and based on the data included in the second content file, the other additional content included in the third content sector in the low resolution, receives, subsequent to transmitting the additional command to the server, the stream of the third content file from the server over the network in place of receiving the stream of the second content file from the server over the network, and switches, in response to the receiving of the stream of the third content file, from rendering the other additional content included in the third content sector in the low resolution based on the second content file to rendering the other additional content included in the third content sector in the high resolution based on the third content file.

13. The media player device of claim 10, wherein the at least one physical computing device further:

detects, additional user input provided by the user representative of a request to shift other additional content included in the first content sector but not included in the second content sector into the field of view in place of the additional content included in the second content sector; and in response to the additional user input
transmits an additional command to the server to switch back from streaming the second content file to streaming the first content file by selecting, from the plurality of URLs, a particular URL corresponding to the first content file,
renders, within the field view before the media player device begins to again receive the stream of the first content file from the server over the network and based on the data included in the second content file, the other additional content included in the first content sector in the low resolution,
receives, subsequent to transmitting the additional command to the server, the stream of the first content file from the server over the network in place of receiving the stream of the second content file from the server over the network, and
switches, in response to the receiving of the stream of the first content file, from rendering the other additional content included in the first content sector in the low resolution based on the second content file to rendering the other additional content included in the first content sector in the high resolution based on the first content file.

14. A virtual reality media backend system comprising:
at least one physical computing device that:
manages a plurality of content files each including data representative of a plurality of partially overlapping content sectors that together form a 360-degree image of an immersive virtual reality world, wherein the plurality of content files includes respective content files associated with each particular content sector, the particular content sector with which a respective content file is associated being encoded in a high resolution within the respective content file while a remainder of the immersive virtual reality world not included in the particular content sector is encoded in a low resolution lower than the high resolution,
the content sectors in the plurality of partially overlapping content sectors are dynamic content sectors that move along with an event occurring within the immersive virtual reality world such that the first content sector persistently depicts a dynamic portion of the immersive virtual reality world to which it is anticipated that a user of the media player device is likely to direct the field of view as the dynamic portion moves within the immersive virtual reality world;
provides, over a network to a media player device that is remote from the virtual reality media backend system, data representative of a plurality of uniform resource locators ("URLs") that each correspond to a different content file in the plurality of content files;
streams, over the network to the media player device, a first content file that is included in the plurality of content files and is associated with the first content sector such that the first content sector is encoded in the high resolution and the second content sector is encoded in the low resolution, wherein while the first content file is streamed to the media player device, the media player device renders, based on the data included in the first content file, content included the first content sector in the high resolution within a field of view of the immersive virtual reality world that is displayed by the media player device on a display screen;
determines that the user of the media player device provides user input representative of a request to shift additional content included in the second content sector but not included in the first content sector into the field of view in place of the content included in the first content sector, the determination performed based on a selection, by the media player device from the plurality of URLs, of a particular URL corresponding to a second content file that is included in the plurality of content files and is associated with the second content sector such that the second content sector is encoded in the high resolution and the first content sector is encoded in the low resolution; and
switches, in response to the determination that the user of the media player device provides the user input, from streaming the first content file to the media player device to streaming the second content file to the media player device for use by the media player device in rendering the additional content in the high resolution within the field of view.

15. The virtual reality media backend system of claim 14, wherein the immersive virtual reality world is generated based on data representative of camera-captured real-world scenery, the data representative of the camera-captured real-world scenery captured by at least one video camera arranged to capture a 360-degree image of the real-world scenery around a center point corresponding to the video camera.

16. The virtual reality media backend system of claim 14, wherein:
the immersive virtual reality world is represented as a spherical structure within the plurality of content files managed by the virtual reality media backend system; and
each content sector in the plurality of partially overlapping content sectors that together form the immersive virtual reality world is a circular image of a portion of the immersive virtual reality world.

17. The method of claim 1, further comprising:
detecting, by the media player device as the media player device renders the content in the first content sector based on the data included in the first content file, other user input representative of another request to shift other content into the field of view, the content and the other content both depicting the dynamic portion to which it is anticipated that the user is likely to direct the field of view as the dynamic portion moves within the immersive virtual reality world; and
rendering, by the media player device in response to the other user input and based on the dynamic content sectors moving along with the event such that the first content sector persistently depicts the dynamic portion to which it is anticipated that the user is likely to direct the field of view, the other content within the field of view based on the data included in the first content file.

18. The method of claim 6, further comprising:
determining, by the virtual reality media backend system as the media player device renders the content in the first content sector based on the data included in the first content file, that the user provides other user input representative of another request to shift other content into the field of view, the content and the other content both depicting the dynamic portion to which it is anticipated that the user is likely to direct the field of view as the dynamic portion moves within the immersive virtual reality world; and continuing streaming, by the virtual reality media backend system in response to the other user input and based on the dynamic content sectors moving along with the event such that the first content sector persistently depicts the dynamic portion to which it is anticipated that the user is likely to direct the field of view, the first content file to the media player device, wherein while the first content file is streamed to the media player device, the media player device renders the other content based on the data included in the first content file.

19. The media player device of claim 10, wherein the at least one physical computing device further:

detects, as the media player device renders the content in the first content sector based on the data included in the first content file, other user input representative of another request to shift other content into the field of view, the content and the other content both depicting the dynamic portion to which it is anticipated that the user is likely to direct the field of view as the dynamic portion moves within the immersive virtual reality world; and renders, in response to the other user input and based on the dynamic content sectors moving along with the event such that the first content sector persistently depicts the dynamic portion to which it is anticipated that the user is likely to direct the field of view, the other content within the field of view based on the data included in the first content file.

20. The virtual reality media backend system of claim 14, wherein the at least one physical computing device further:

determines, as the media player device renders the content in the first content sector based on the data included in the first content file, that the user provides other user input representative of another request to shift other content into the field of view, the content and the other content both depicting the dynamic portion to which it is anticipated that the user is likely to direct the field of view as the dynamic portion moves within the immersive virtual reality world; and continues to stream, in response to the other user input and based on the dynamic content sectors moving along with the event such that the first content sector persistently depicts the dynamic portion to which it is anticipated that the user is likely to direct the field of view, the first content file to the media player device, wherein while the first content file is streamed to the media player device, the media player device renders the other content based on the data included in the first content file.

* * * * *